(12) United States Patent
Shigeta et al.

(10) Patent No.: US 12,455,202 B2
(45) Date of Patent: Oct. 28, 2025

(54) TORQUE SENSOR

(71) Applicant: NSK LTD., Tokyo (JP)

(72) Inventors: Taishi Shigeta, Gunma (JP); Tomofumi Shigeyama, Gunma (JP)

(73) Assignee: NSK LTD., Tokyo (JP)

( * ) Notice: Subject to any disclaimer, the term of this patent is extended or adjusted under 35 U.S.C. 154(b) by 388 days.

(21) Appl. No.: 18/000,340

(22) PCT Filed: Jul. 16, 2021

(86) PCT No.: PCT/JP2021/026742
§ 371 (c)(1),
(2) Date: Nov. 30, 2022

(87) PCT Pub. No.: WO2022/085257
PCT Pub. Date: Apr. 28, 2022

(65) Prior Publication Data
US 2023/0221199 A1    Jul. 13, 2023

(30) Foreign Application Priority Data
Oct. 22, 2020    (JP) .................. 2020-177313

(51) Int. Cl.
*G01L 3/10*    (2006.01)
*G01L 5/22*    (2006.01)

(52) U.S. Cl.
CPC .............. *G01L 3/104* (2013.01); *G01L 5/221* (2013.01)

(58) Field of Classification Search
None
See application file for complete search history.

(56) References Cited

U.S. PATENT DOCUMENTS

| | | | |
|---|---|---|---|
| 12,209,925 B2 * | 1/2025 | Shigeta | .................. G01L 3/104 |
| 2001/0020882 A1 * | 9/2001 | Heinrich | ............... H01F 7/0252 |
| | | | 428/66.6 |

(Continued)

FOREIGN PATENT DOCUMENTS

| | | |
|---|---|---|
| CN | 104520686 A | 4/2015 |
| DE | 10 2008 047 466 A1 | 4/2010 |

(Continued)

OTHER PUBLICATIONS

Extended European Search Report dated Jul. 19, 2024 in Application No. 21882398.7.

(Continued)

*Primary Examiner* — Stephanie E Bloss
*Assistant Examiner* — Diana Hancock
(74) *Attorney, Agent, or Firm* — Sughrue Mion, PLLC

(57) ABSTRACT

In a torque sensor (1), a sleeve (21) is an annular member mounted on a first rotating member. An intermediate member (26) is an annular member placed on an outer circumferential face of the sleeve (21). A magnet (25) is an annular member placed on an outer circumferential face of the intermediate member (26). A yoke (35) is mounted on a second rotating member and faces the magnet (25) in a radial direction. A rotating member connecting part (211) of the sleeve (21) is cylindrical and is in contact with the first rotating member. An intermediate member connecting part (215) is at a position shifted with respect to the rotating member connecting part (211) in an axial direction parallel to a central axis Z. An outer diameter (E219) of a sleeve end (219), which is an end of the intermediate member connecting part (215) opposite from the rotating member connecting part (211), is smaller than a minimum inner diameter (125) of the magnet (25).

9 Claims, 17 Drawing Sheets

(56) References Cited

U.S. PATENT DOCUMENTS

| | | | |
|---|---|---|---|
| 2011/0120798 A1* | 5/2011 | Kawada | B62D 5/0409 180/444 |
| 2013/0255401 A1* | 10/2013 | Ishimoto | G01L 3/104 73/862.325 |
| 2015/0175198 A1* | 6/2015 | Shigeta | B62D 6/10 180/443 |
| 2015/0211947 A1* | 7/2015 | Yoshida | B62D 6/10 73/862.325 |
| 2018/0224343 A1* | 8/2018 | Jun | B62D 5/0481 |
| 2020/0386636 A1 | 12/2020 | Shigeta | |

FOREIGN PATENT DOCUMENTS

| | | |
|---|---|---|
| EP | 2 594 915 A2 | 5/2013 |
| JP | 2012-194143 A | 10/2012 |
| WO | 2014/046076 A1 | 3/2014 |
| WO | 2019/059230 A1 | 3/2019 |

OTHER PUBLICATIONS

International Search Report for PCT/JP2021/026742 dated Oct. 5, 2021.
Office Action issued Jan. 25, 2025 in Chinese Patent Application No. 202180039339.0.

* cited by examiner

TORQUE SENSOR

CROSS REFERENCE TO RELATED APPLICATIONS

This application is a National Stage of International Application No. PCT/JP2021/026742 filed Jul. 16, 2021, claiming priority based on Japanese Patent Application No. 2020-177313 filed Oct. 22, 2020.

FIELD

The present invention relates to a torque sensor.

BACKGROUND

Electric power steering apparatuses installed in vehicles include a torque sensor to detect steering torque. The torque sensor varies its output in response to the relative rotation of an input shaft and an output shaft coupled to each other via a torsion bar. An electronic control unit (ECU) controls a motor based on information obtained from the torque sensor, and the torque generated by the motor assists steering. Patent Literature 1 describes an example of the torque sensor, for example. In the torque sensor of Patent Literature 1, a magnet is mounted on a steering shaft via a sleeve. The sleeve includes a small diameter part that is press-fit onto the steering shaft and a large diameter part to which the magnet is fixed with an adhesive. With this structure, when the sleeve is press-fit onto the steering shaft, the deformation of the large diameter part holding the magnet is prevented. Consequently, the distance between the magnet and a yoke is less likely to deviate from a designed value, thereby preventing deterioration in the detection accuracy of the torque sensor.

CITATION LIST

Patent Literature

[Patent Literature 1] WO 2019/059230

SUMMARY

Technical Problem

By the way, the sleeve supporting the magnet in Patent Literature 1 is desirably small in a radial direction while including the small diameter part and the large diameter part. However, if the step between the small diameter part and the large diameter part is made smaller, when the sleeve is press-fit onto the steering shaft, the step between the small diameter part and the large diameter part cannot be pushed. Although the tip of the large diameter part can be pushed in place of the step, pushing the tip of the large diameter part may cause stress in the magnet. When stress occurs in the magnet, the magnetic properties of the magnet change, which may thus produce magnets that do not meet shipping specifications. Thus, in the manufacture of steering apparatuses, the yield reduces.

The present disclosure has been made in view of the above problem, and an object thereof is to provide a torque sensor that can prevent deterioration in detection accuracy and prevent stress from occurring in a magnet when it is fixed to a rotating member.

Solution to Problem

To solve the above object, a torque sensor according to an embodiment of the present disclosure comprising: an annular sleeve mounted on a first rotating member; an annular intermediate member placed on an outer circumferential face of the sleeve; an annular magnet placed on an outer circumferential face of the intermediate member; and a yoke mounted on a second rotating member rotating with respect to the first rotating member, the yoke facing the magnet in a radial direction that is a direction orthogonal to a central axis of the sleeve, the sleeve including: a cylindrical rotating member connecting part being in contact with the first rotating member; and a cylindrical intermediate member connecting part at a position shifted with respect to the rotating member connecting part in an axial direction parallel to the central axis, and an outer diameter of a sleeve end that is an end of the intermediate member connecting part opposite from the rotating member connecting part being smaller than a minimum inner diameter of the magnet.

The rotating member connecting part is in contact with the first rotating member to prevent the deformation of the intermediate member connecting part holding the magnet when the sleeve is press-fit onto the first rotating member. Thus, the distance between the magnet and the yoke is less likely to deviate from a designed value. Consequently, the torque sensor can prevent deterioration in detection accuracy. Further, even if the sleeve end is pushed when the sleeve is press-fit onto the first rotating member, stress is less likely to occur in the magnet. Consequently, the torque sensor of the present disclosure can prevent deterioration in detection accuracy and prevent stress from occurring in the magnet when it is fixed to the rotating member.

As a desirable aspect of the torque sensor, an outer diameter of the intermediate member connecting part is larger than an outer diameter of the rotating member connecting part.

With this structure, the stress occurring in the rotating member connecting part in the step of press-fitting the sleeve onto the input shaft is absorbed by the deformation of an enlarged part lying between the rotating member connecting part and the intermediate member connecting part. Thus, the stress having occurred in the step of press-fitting the sleeve can be prevented from being transmitted to the intermediate member connecting part.

As a desirable aspect of the torque sensor, an outer diameter of the intermediate member connecting part is smaller than an outer diameter of the rotating member connecting part.

With this structure, the magnet can be placed more inside in the radial direction compared to a case in which the outer diameter of the intermediate member connecting part is larger than the outer diameter of the rotating member connecting part. Thus, the torque sensor can be reduced in size.

As a desirable aspect of the torque sensor, an outer diameter of the intermediate member connecting part and an outer diameter of the rotating member connecting part are same as each other.

With this structure, the magnet can be placed more inside in the radial direction compared to a case in which the outer diameter of the intermediate member connecting part is larger than the outer diameter of the rotating member connecting part. Thus, the torque sensor can be reduced in size. Further, the form of the sleeve becomes simple, it is possible to facilitate the manufacturing process of the sleeve.

As a desirable aspect of the torque sensor, the outer diameter of the sleeve end is larger than the inner diameter of an intermediate member end, which is an end of the intermediate member opposite from the rotating member connecting part, and is smaller than the outer diameter of the intermediate member end.

With this structure, the sleeve end prevents the intermediate member from falling, and thus the possibility of the occurrence of position deviation of the intermediate member reduces. Consequently, the torque sensor of the present disclosure can further reduce the possibility of the occurrence of deterioration in detection accuracy.

As a desirable aspect of the torque sensor, the intermediate member is placed with a gap with respect to the sleeve end in the axial direction.

With this structure, even if the sleeve end is pushed when the sleeve is press-fit onto the first rotating member, deformation is less likely to occur in the intermediate member. Consequently, stress is much less likely to occur in the magnet being in contact with the intermediate member. Consequently, the torque sensor of the present disclosure can further prevent the stress occurring in the magnet when it is fixed to the rotating member.

As a desirable aspect of the torque sensor, the outer diameter of the sleeve end is not more than the inner diameter of the intermediate member end, which is the end of the intermediate member opposite from the rotating member connecting part.

With this structure, even if the sleeve end is pushed when the sleeve is press-fit onto the first rotating member, deformation is less likely to occur in the intermediate member. Consequently, stress is much less likely to occur in the magnet being in contact with the intermediate member. Consequently, the magnet assembly of the present disclosure can further prevent the stress occurring in the magnet when it is fixed to the rotating member.

Advantageous Effects of Invention

The torque sensor of the present disclosure can prevent deterioration in detection accuracy and prevent stress from occurring in the magnet when it is fixed to the rotating member.

DESCRIPTION OF EMBODIMENTS

The following describes the present invention in detail with reference to the accompanying drawings. The present invention is not limited by the following mode to perform the invention (hereinafter, referred to as an embodiment). In addition, the components in the following embodiment include ones that can be readily thought of by those skilled in the art, substantially the same ones, and ones in what is called equivalents. Furthermore, the components disclosed in the following embodiment can be combined with each other as appropriate.

EMBODIMENT

Figure 1:
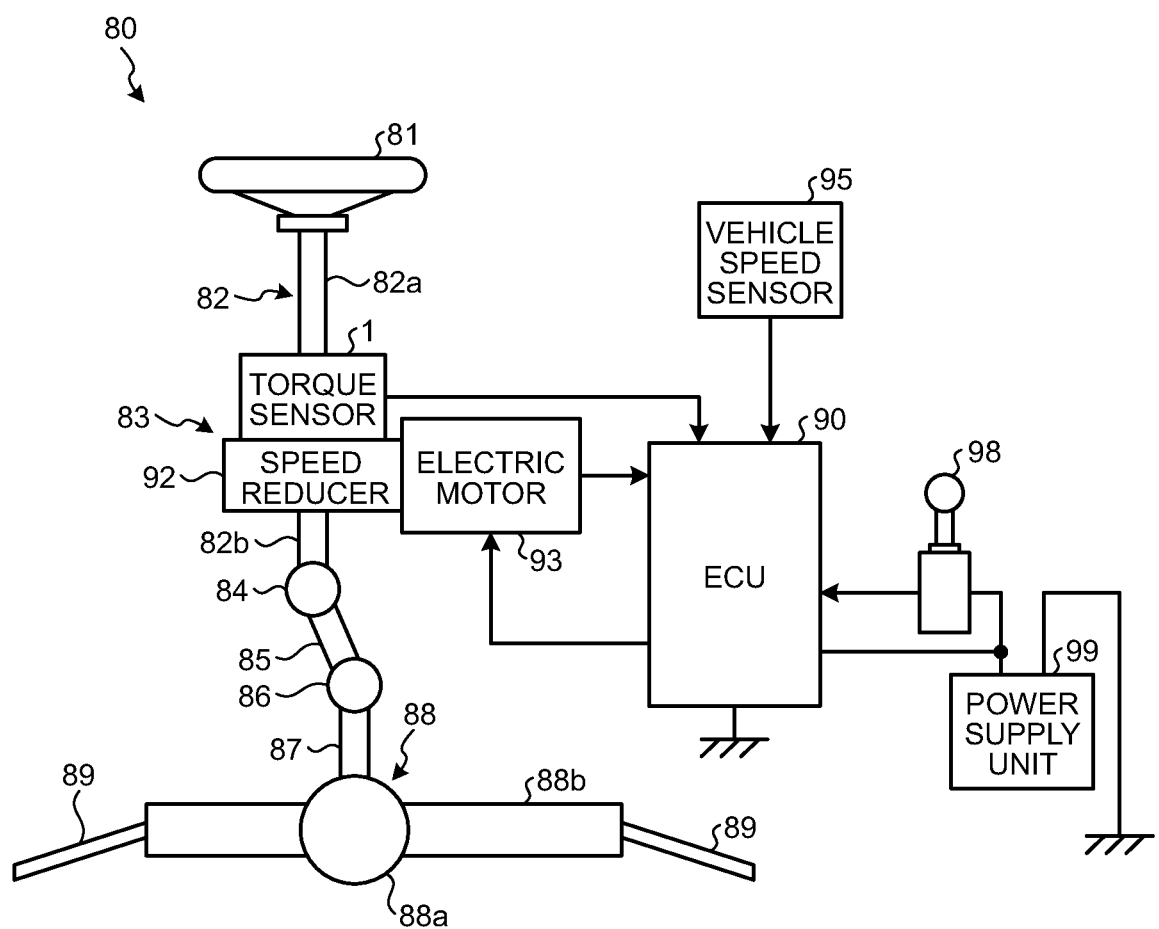
FIG. 1 is a schematic diagram of a steering apparatus of the present embodiment.
Figure 2:
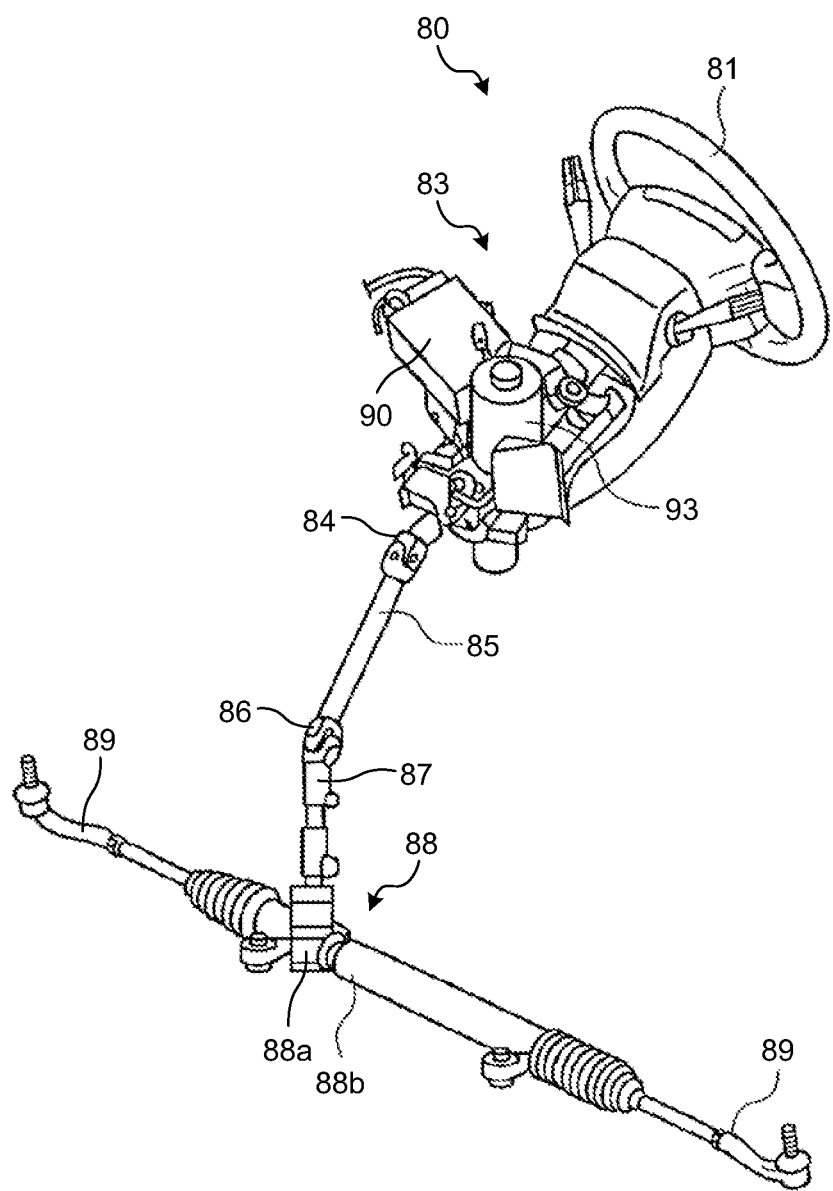
FIG. 2 is a perspective view of the steering apparatus of the present embodiment.
Figure 3:
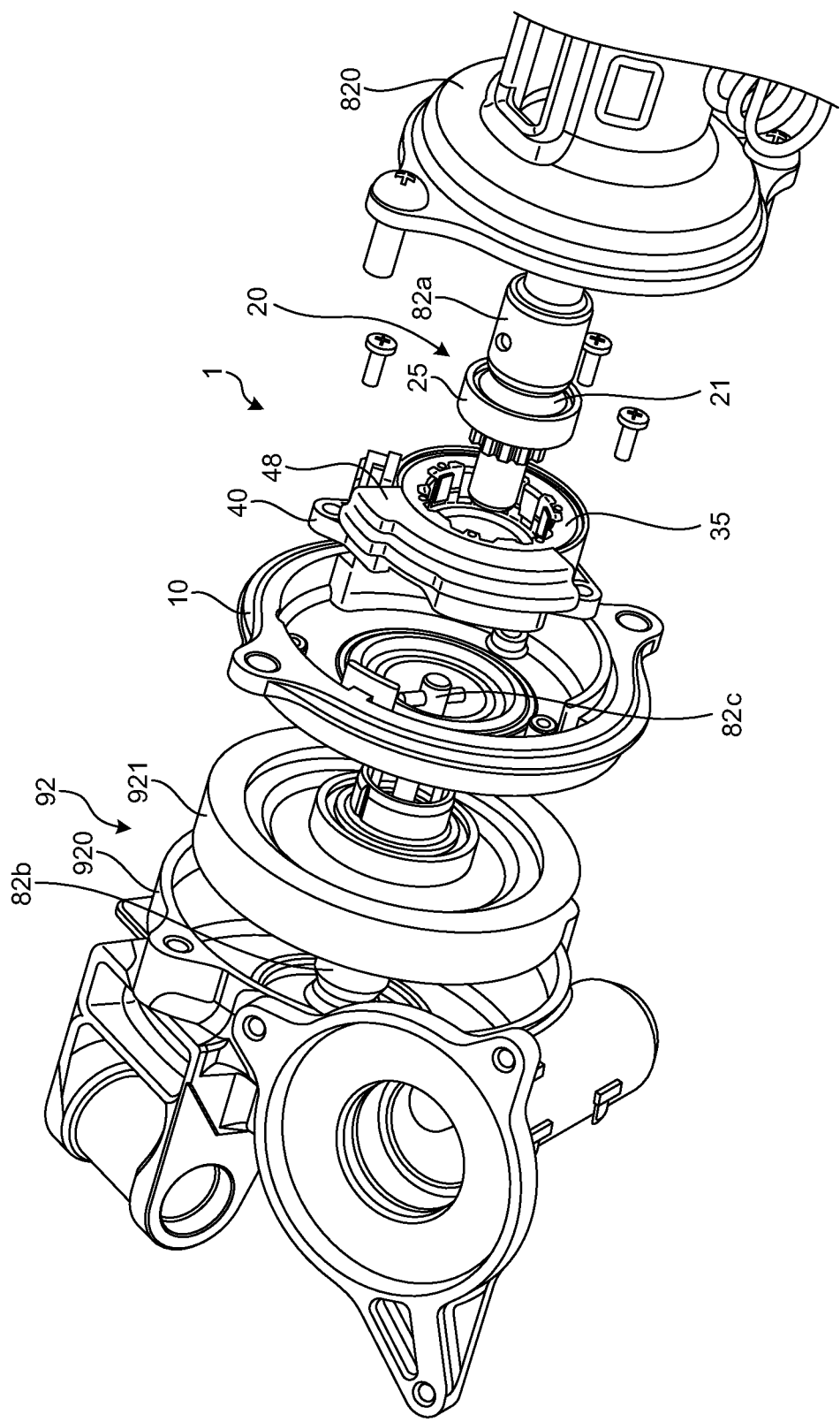
FIG. 3 is an exploded perspective view of the steering apparatus of the present embodiment.
Figure 4:
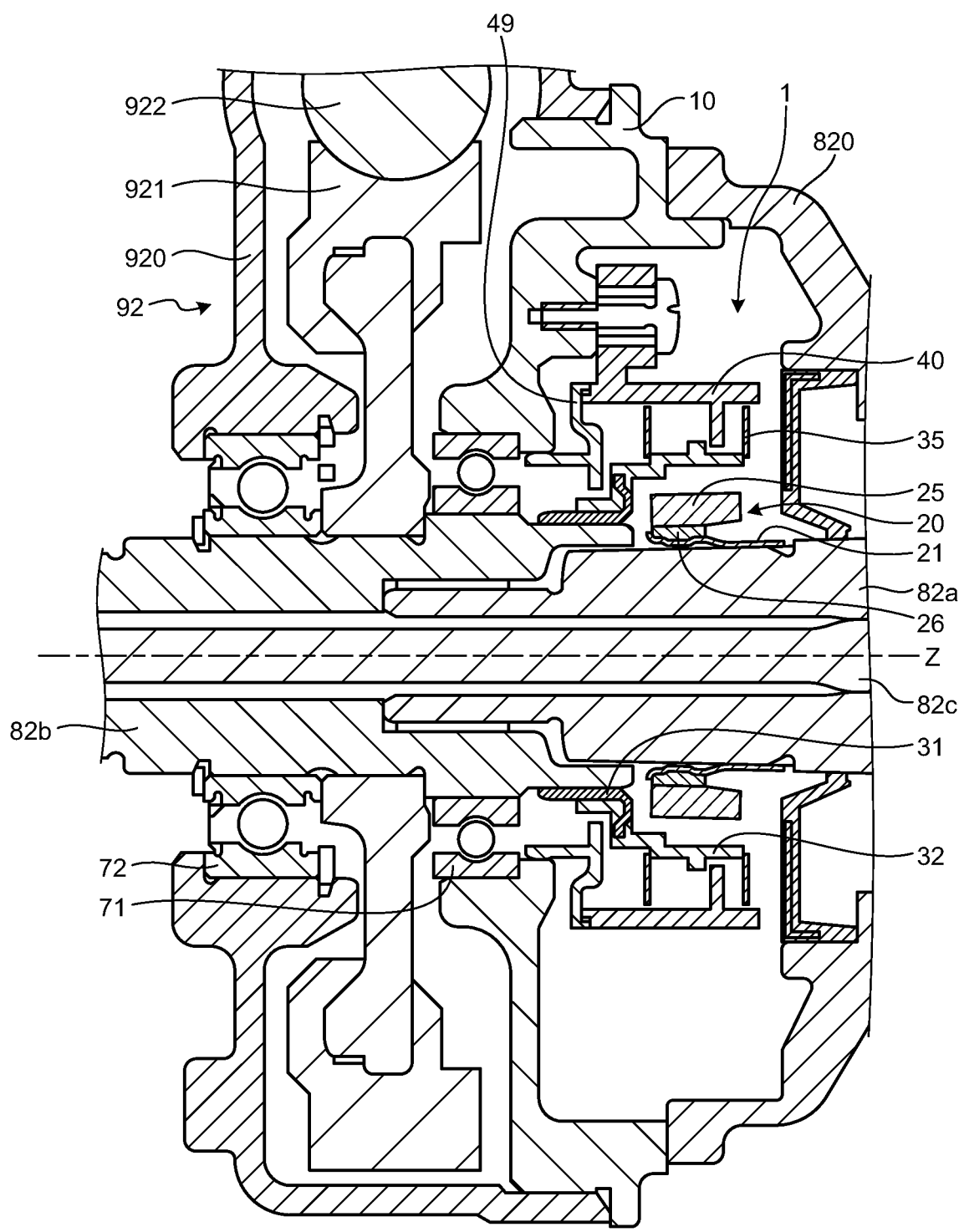
FIG. 4 is a sectional view of the steering apparatus of the present embodiment.

FIG. 1 is a schematic diagram of a steering apparatus of the present embodiment. FIG. 2 is a perspective view of the steering apparatus of the present embodiment. FIG. 3 is an exploded perspective view of the steering apparatus of the present embodiment. FIG. 4 is a sectional view of the steering apparatus of the present embodiment.

As illustrated in FIG. 1, this steering apparatus 80 includes, in order of transmission of force given by an operator, a steering wheel 81, a steering shaft 82, a steering force assist mechanism 83, a universal joint 84, an intermediate shaft 85, and a universal joint 86 and is joined to a pinion shaft 87. In the following description, the front of a vehicle in which the steering apparatus 80 is installed is simply described as the front, whereas the rear of the vehicle is simply described as the rear. As illustrated in FIG. 2, the steering force assist mechanism 83 is provided near the steering wheel 81 and is placed in a vehicle cabin separated from the outside. As illustrated in FIG. 3, the steering apparatus 80 includes a gearbox 920, an intermediate plate 10, and a column housing 820. The gearbox 920 is mounted on the vehicle, whereas the column housing 820 is fixed to the gearbox 920 via the intermediate plate 10.

As illustrated in FIG. 1 and FIG. 4, the steering shaft 82 includes an input shaft 82a, an output shaft 82b, and a torsion bar 82c. The input shaft 82a is supported on the column housing 820 illustrated in FIG. 4 via a bearing. The input shaft 82a can rotate with respect to the column housing 820. One end of the input shaft 82a is coupled to the steering wheel 81. The other end of input shaft 82a is coupled to the torsion bar 82*c*. The torsion bar 82*c* fits into a hole provided at the center of the input shaft 82*a* and is fixed to the input shaft 82*a* via a pin.

As illustrated in FIG. 4, the output shaft 82*b* is supported on the intermediate plate 10 via a bearing 71 and is supported on the gearbox 920 via a bearing 72. The bearing 71 is press-fit into the intermediate plate 10, whereas the bearing 72 is press-fit into the gearbox 920, for example. The output shaft 82*b* can rotate with respect to the intermediate plate 10 and the gearbox 920. One end of the output shaft 82*b* is coupled to the torsion bar 82*c*. The other end of the output shaft 82*b* is coupled to the universal joint 84. The torsion bar 82*c* is press-fit into a hole provided at the center of the output shaft 82*b* to be fixed to the output shaft 82*b*.

A front end of the input shaft 82*a* is positioned inside the output shaft 82*b*. A protrusion provided on either an outer circumferential face of the input shaft 82*a* or an inner circumferential face of the output shaft 82*b* fits into a recess provided on the other. With this structure, even when the torsion bar 82*c* no longer functions as a coupling member, torque is transmitted between the input shaft 82*a* and the output shaft 82*b*.

As illustrated in FIG. 1, the intermediate shaft 85 couples the universal joint 84 and the universal joint 86 to each other. One end of the intermediate shaft 85 is coupled to the universal joint 84, whereas the other end thereof is coupled to the universal joint 86. One end of the pinion shaft 87 is coupled to the universal joint 86, whereas the other end of the pinion shaft 87 is coupled to a steering gear 88. The universal joint 84 and the universal joint 86 are cardan joints, for example. The rotation of the steering shaft 82 is transmitted to the pinion shaft 87 via the intermediate shaft 85. That is, the intermediate shaft 85 rotates with the steering shaft 82.

As illustrated in FIG. 1, the steering gear 88 includes a pinion 88*a* and a rack 88*b*. The pinion 88*a* is coupled to the pinion shaft 87. The rack 88*b* engages with the pinion 88*a*. The steering gear 88 converts a rotational motion transmitted to the pinion 88*a* into a linear motion by the rack 88*b*. The rack 88*b* is coupled to tie rods 89. The rack 88*b* moves to change the angle of wheels.

As illustrated in FIG. 1, the steering force assist mechanism 83 includes a speed reducer 92 and an electric motor 93. The speed reducer 92 is a worm speed reducer, for example, and includes the gearbox 920, a worm wheel 921, and a worm 922 as illustrated in FIG. 3 and FIG. 4. The torque generated by the electric motor 93 is transmitted to the worm wheel 921 via the worm 922, which rotates the worm wheel 921. The worm 922 and worm wheel 921 increase the torque generated by the electric motor 93. The worm wheel 921 is fixed to the output shaft 82*b*. The worm wheel 921 is press-fit onto the output shaft 82*b*, for example. Thus, the speed reducer 92 gives auxiliary steering torque to the output shaft 82*b*. The steering apparatus 80 is a column-assist type electric power steering apparatus.

As illustrated in FIG. 1, the steering apparatus 80 includes an electronic control unit (ECU) 90, a torque sensor 1, and a vehicle speed sensor 95. The electric motor 93, the torque sensor 1, and the vehicle speed sensor 95 are electrically connected to the ECU 90. The torque sensor 1 outputs steering torque transmitted to the input shaft 82*a* to the ECU 90 via Controller Area Network (CAN) communication. The vehicle speed sensor 95 detects the travel speed (vehicle speed) of a vehicle body in which the steering apparatus 80 is installed. The vehicle speed sensor 95 is provided in the vehicle body and outputs the vehicle speed to the ECU 90 via CAN communication.

The ECU 90 controls the operation of the electric motor 93. The ECU 90 acquires a signal from each of the torque sensor 1 and the vehicle speed sensor 95. The ECU 90 is supplied with electric power from a power supply unit 99 (a vehicle-mounted battery, for example) with an ignition switch 98 on. The ECU 90 calculates an auxiliary steering command value based on the steering torque and the vehicle speed. The ECU 90 adjusts an electric power value to be supplied to the electric motor 93 based on the auxiliary steering command value. The ECU 90 acquires information on the induced voltage of the electric motor 93 or information output from a resolver or the like provided in the electric motor 93. The ECU 90 controls the electric motor 93 to reduce the force required to operate the steering wheel 81.

Figure 5:
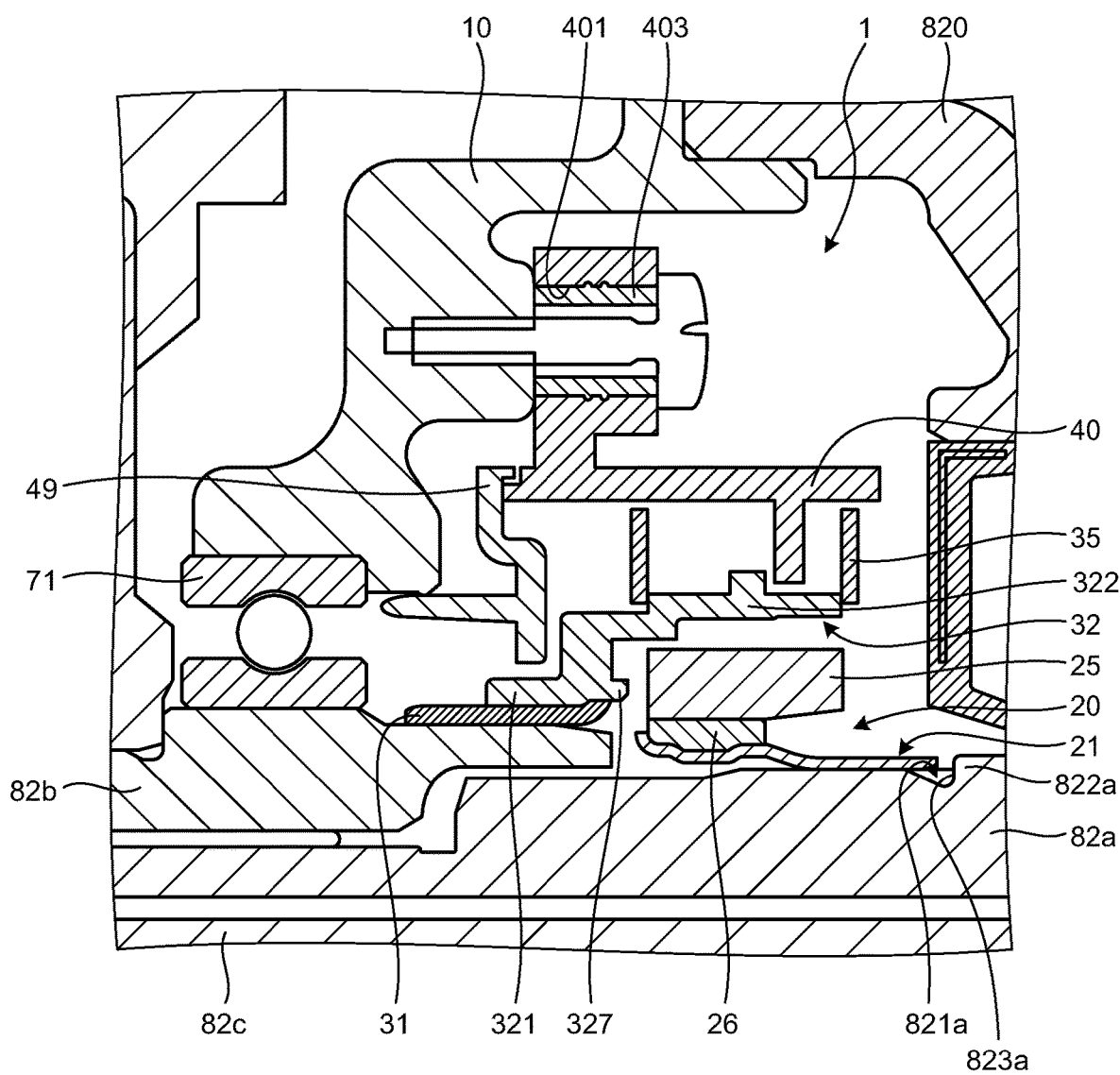
FIG. 5 is an enlarged view of a part of FIG. 4.
Figure 6:
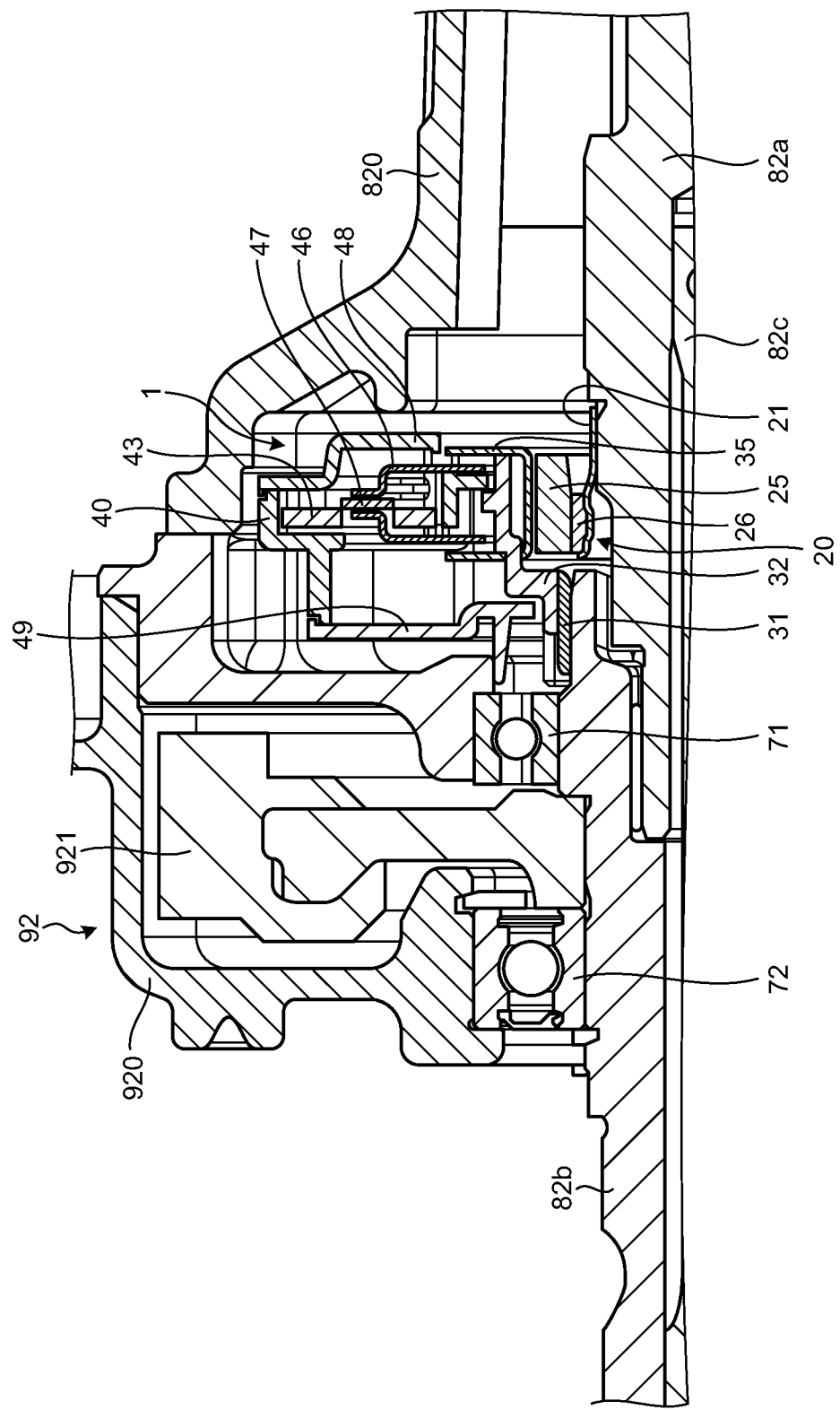
FIG. 6 is a sectional view of the steering apparatus of the present embodiment cut in a plane different from that in FIG. 4.
Figure 7:
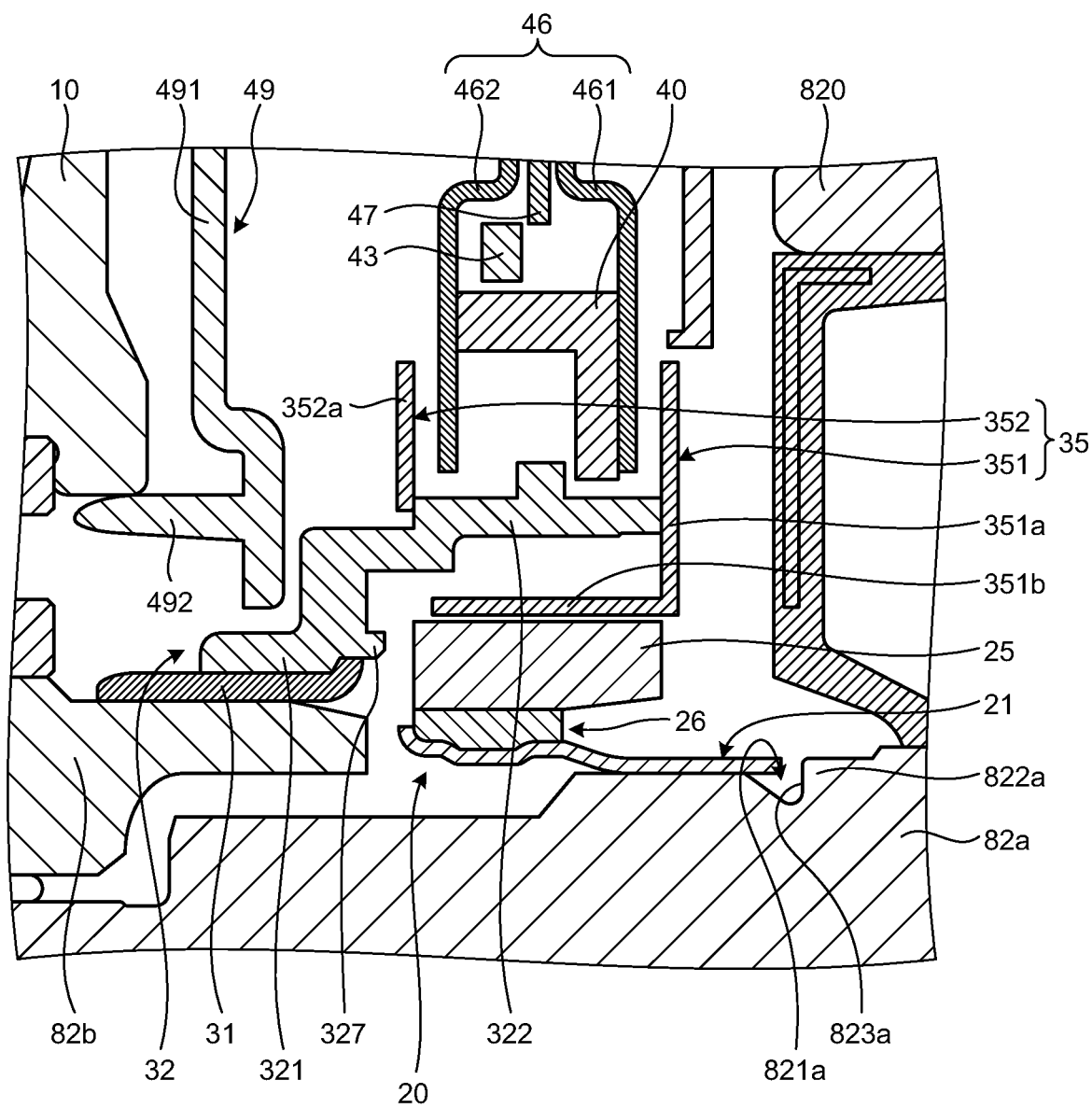
FIG. 7 is an enlarged view of a part of FIG. 6.
Figure 8:
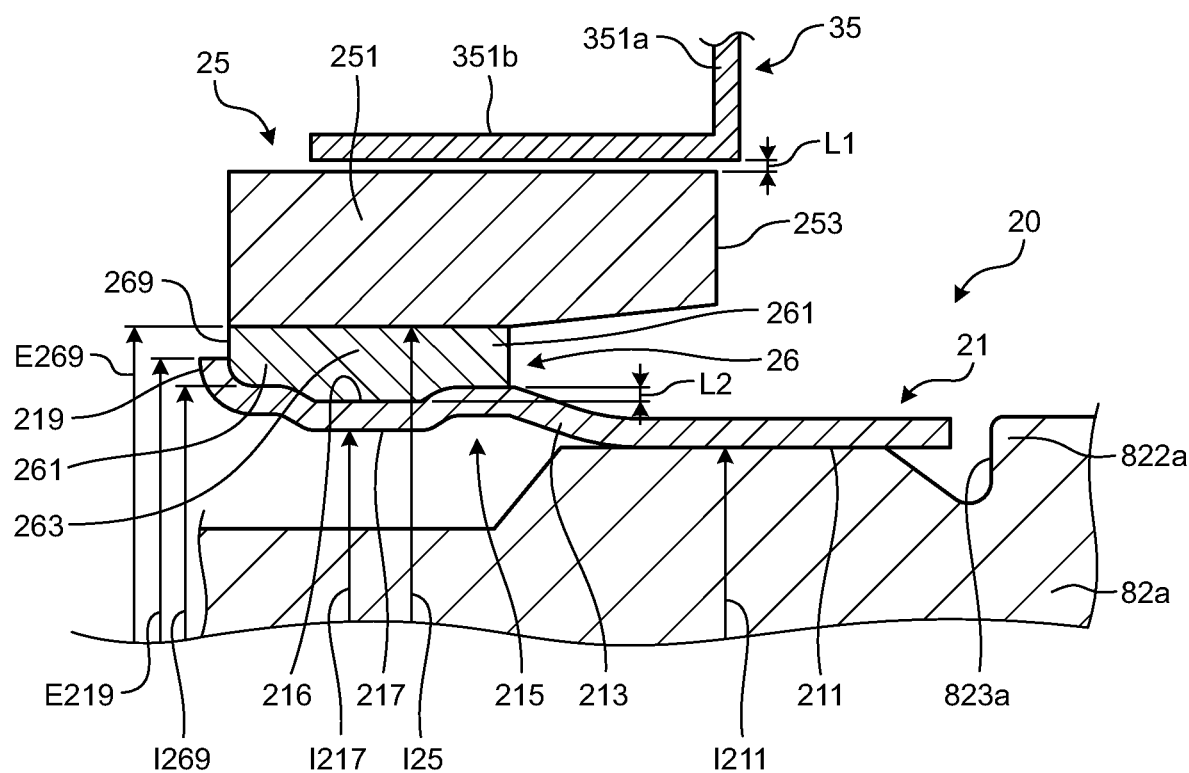
FIG. 8 is a sectional view of the area around a magnet assembly of the present embodiment.
Figure 9:
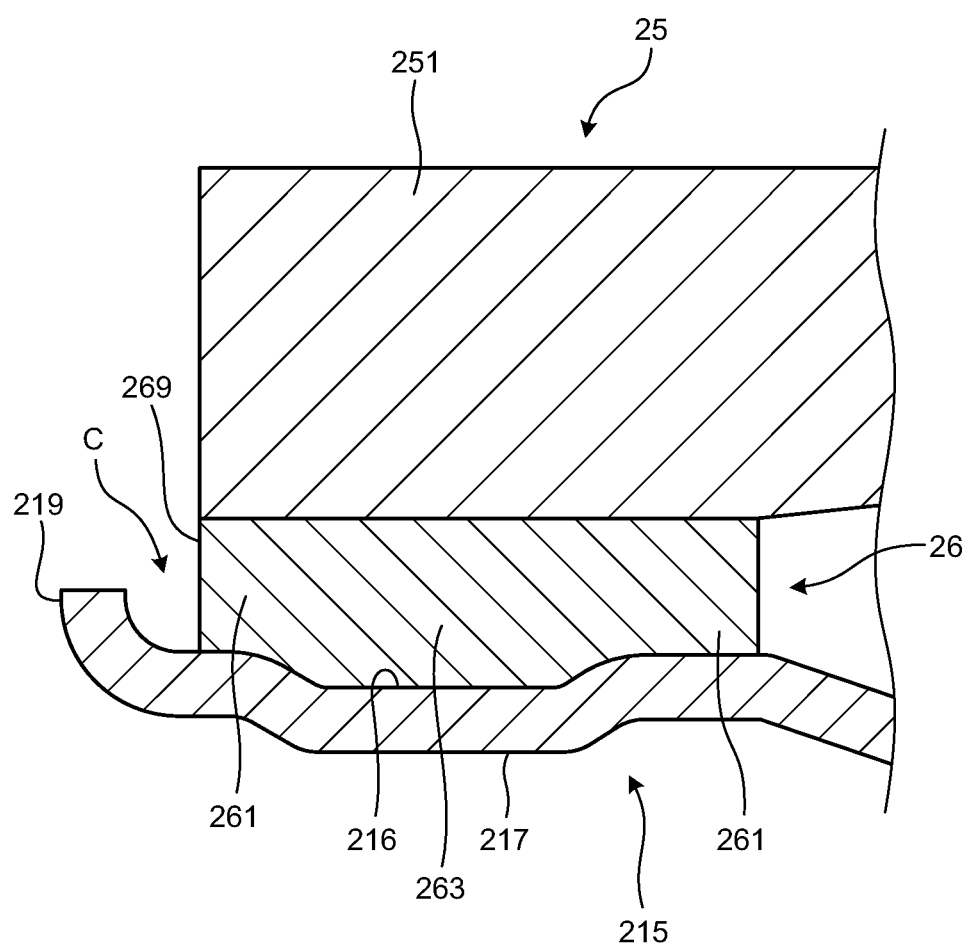
FIG. 9 is an enlarged view of a part of FIG. 8.
Figure 10:
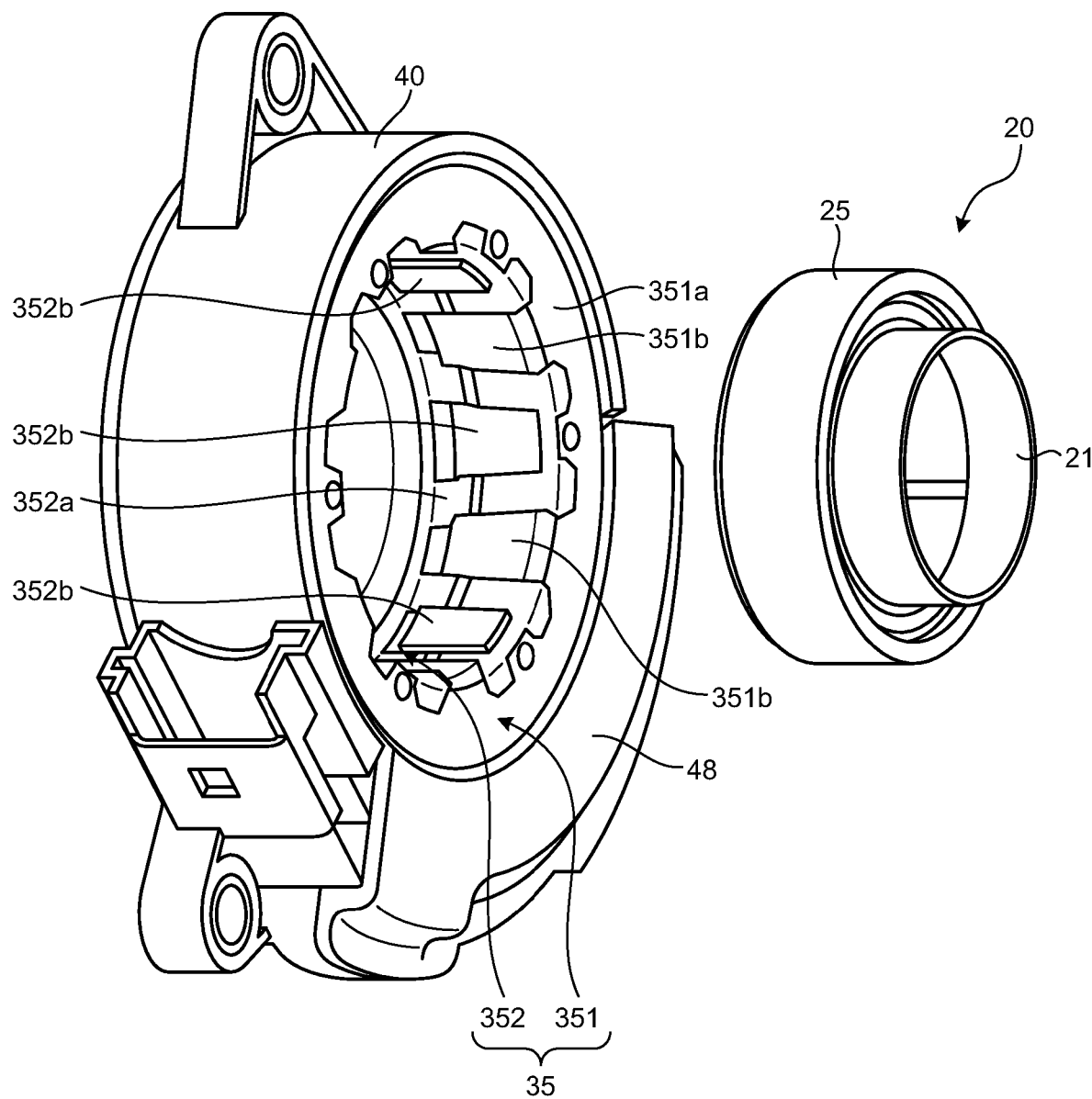
FIG. 10 is an exploded perspective view of the magnet assembly, a yoke, and the like of the present embodiment.
Figure 11:
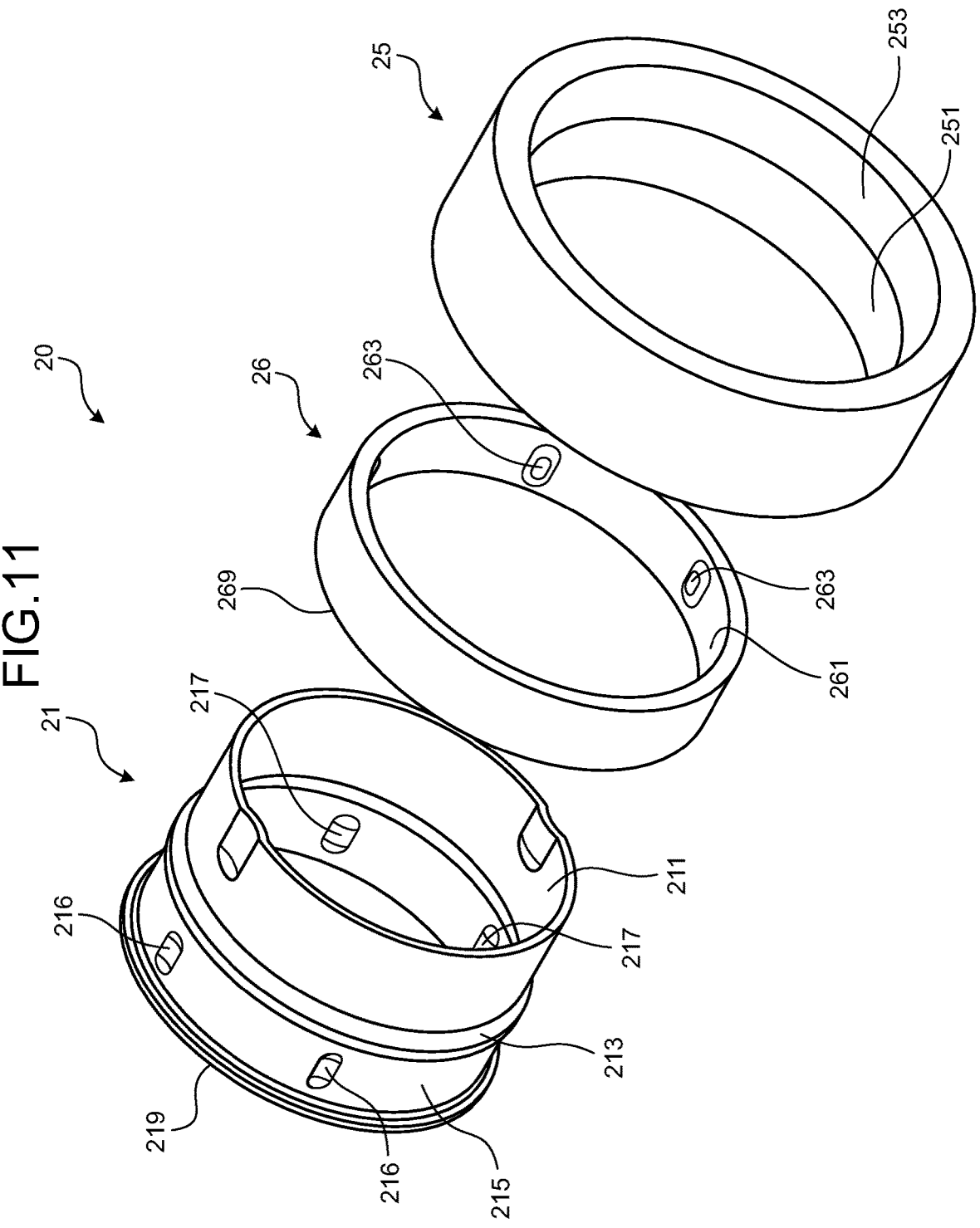
FIG. 11 is an exploded perspective view of the magnet assembly of the present embodiment.

FIG. 5 is an enlarged view of a part of FIG. 4. FIG. 6 is a sectional view of the steering apparatus of the present embodiment cut in a plane different from that in FIG. 4. FIG. 7 is an enlarged view of a part of FIG. 6. FIG. 8 is a sectional view of the area around a magnet assembly of the present embodiment. FIG. 9 is an enlarged view of a part of FIG. 8. FIG. 10 is an exploded perspective view of the magnet assembly, a yoke, and the like of the present embodiment. FIG. 11 is an exploded perspective view of the magnet assembly of the present embodiment.

As illustrated in FIG. 4, the torque sensor 1 is placed between the column housing 820 and the gearbox 920. More specifically, the torque sensor 1 is positioned in the space lying between the column housing 820 and the intermediate plate 10. As illustrated in FIG. 4 to FIG. 7, the torque sensor 1 includes a magnet assembly 20, a sleeve 31 (a second sleeve), a carrier 32, a yoke 35, a sensor housing 40, a magnetism collecting member 46, a printed circuit board 43, a Hall IC 47, a first cover 48, and a second cover 49. As illustrated in FIG. 8, the magnet assembly 20 includes a sleeve 21 (a first sleeve), an intermediate member 26, and a magnet 25.

The sleeve 21 is a nonmagnetic body and metal. Specific examples of the nonmagnetic metal include austenitic stainless steel (SUS 304). As illustrated in FIG. 5, the sleeve 21 is a tubular member and is mounted on the input shaft 82*a*. The sleeve 21 is formed by deep drawing, for example. The sleeve 21 includes a rotating member connecting part 211, an intermediate member connecting part 215, and an enlarged part 213. In the following description, the direction parallel to a central axis Z of the sleeve 21 is described as an axial direction. The direction orthogonal to the central axis Z and parallel to a straight line passing through the central axis Z is described as a radial direction. The direction along the circumference centered on the central axis Z is described as a circumferential direction. The central axis Z is the same straight line as the axis of rotation of the input shaft 82*a*.

As illustrated in FIG. 8, the rotating member connecting part 211 is a cylindrical member and is press-fit onto an outer circumferential face of the input shaft 82*a*. A rear end face of the rotating member connecting part 211 faces an end face 823*a* of a raised part 822*a* of the input shaft 82*a*. A part of the input shaft 82*a* corresponding to a rear end of the rotating member connecting part 211 is provided with an annular groove 821*a*. The intermediate member connecting part 215 is a cylindrical member. The outer diameter of the intermediate member connecting part 215 is larger than the outer diameter of the rotating member connecting part 211. The intermediate member connecting part 215 is at a position shifted with respect to the rotating member connecting part 211 in the axial direction. The intermediate member connecting part 215 is positioned at the front of the rotating member connecting part 211. The enlarged part 213 connects the rotating member connecting part 211 and the intermediate member connecting part 215 to each other. The outer diameter of the enlarged part 213 increases from the rotating member connecting part 211 toward the intermediate member connecting part 215.

By connecting the rotating member connecting part 211 and the intermediate member connecting part 215 to each other with the enlarged part 213, the rotating member connecting part 211 and the intermediate member connecting part 215 can be placed at positions separated from each other in the axial direction and positions separated from each other in the radial direction. By configuring the sleeve 21 in this way, stress occurring in the rotating member connecting part 211 in the step of press-fitting the sleeve 21 onto the input shaft 82a is absorbed by the deformation of the enlarged part 213, and thus the stress having occurred in the step of press-fitting the sleeve 21 can be prevented from being transmitted to the intermediate member connecting part 215.

The magnet 25 is placed in the intermediate member connecting part 215 via the intermediate member 26, and thus the stress having occurred in the step of press-fitting can be prevented from being transmitted to the magnet 25 via the intermediate member connecting part 215 and the intermediate member 26. By preventing the stress from acting on the magnet 25, deterioration in sensor output characteristics along with the demagnetization of the magnet 25 can be prevented.

As illustrated in FIG. 8, the intermediate member connecting part 215 includes a plurality of recesses 216, a plurality of protrusions 217, and a sleeve end 219. The recesses 216 are provided on an outer circumferential face of the intermediate member connecting part 215. The protrusions 217 are provided on an inner circumferential face of the intermediate member connecting part 215. The protrusions 217 are provided on the back side of the recesses 216. The recesses 216 and the protrusions 217 are formed in one step by press working, for example. That is, the outer circumferential face of the intermediate member connecting part 215 is plastically deformed inward in the radial direction to form the recesses 216 and the protrusions 217. The protrusions 217 are placed outside an inner circumferential face of the rotating member connecting part 211 in the radial direction. That is, an inner diameter I217 of the protrusions 217 is larger than an inner diameter I211 of the rotating member connecting part 211. The number of the recesses 216 and the number of the protrusions 217 are each even. As illustrated in FIG. 11, an even number of recesses 216 and an even number of protrusions 217 are placed at regular intervals in the circumferential direction. Thus, for one set of a recess 216 and a protrusion 217, there is another set of a recess 216 and a protrusion 217 on the opposite side across the central axis Z. The sleeve end 219 is an end of the intermediate member connecting part 215 opposite from the rotating member connecting part 211 (the front side). The sleeve end 219 extends outward in the radial direction.

As illustrated in FIG. 8, the intermediate member 26 is placed on the outer circumferential face of the intermediate member connecting part 215. The intermediate member 26 is formed in an annular shape. The intermediate member 26 is resin. Specific examples of the resin include polyphenylene sulfide (PPS) and polyamide 12 (PA12).

The intermediate member 26 includes a thin-walled part 261, a plurality of thick-walled parts 263, and an intermediate member end 269. The wall thickness of the thick-walled parts 263 is larger than the wall thickness of the thin-walled part 261. The wall thickness means a thickness in the radial direction and is used in the same meaning in the following description. In the present embodiment, as illustrated in FIG. 11, the thin-walled part 261 is formed in an annular shape, whereas an even number of thick-walled parts 263 are placed at regular intervals in the circumferential direction. As illustrated in FIG. 8, in a cross section containing the central axis Z, a thick-walled part 263 lies between a part of the thin-walled part 261 and another part of the thin-walled part 261 in the axial direction. The thick-walled part 263 lies between the thin-walled part 261 at both sides in the axial direction. In other words, in the cross section containing the central axis Z, the wall thickness of the intermediate member 26 is not constant and varies with the position in the axial direction. Inner circumferential faces of the thin-walled part 261 and the thick-walled parts 263 are in contact with the outer circumferential face of the intermediate member connecting part 215. An inner end of the thick-walled part 263 in the radial direction is in each of the recesses 216 of the intermediate member connecting part 215.

The intermediate member end 269 is an end of the intermediate member 26 opposite from the rotating member connecting part 211 (the front side). When viewed in the axial direction, part of the intermediate member end 269 overlaps the sleeve end 219. An outer diameter E219 of the sleeve end 219 is larger than an inner diameter I269 of the intermediate member end 269 and is smaller than an outer diameter E269 of the intermediate member end 269. As illustrated in FIG. 9, the intermediate member end 269 is placed with a gap C with respect to the sleeve end 219 in the axial direction. Note that the gap C is drawn exaggeratedly in FIG. 9, and the illustrated size of the gap C may differ from an actual size.

As illustrated in FIG. 8, the magnet 25 is placed on an outer circumferential face of the intermediate member 26. The magnet 25 is formed in an annular shape. In the annular magnet 25, the S pole and the N pole are placed alternately in the circumferential direction. The magnet 25 can be said to be mounted on the sleeve 21 via the intermediate member 26. Thus, the magnet 25 rotates with the input shaft 82a and the sleeve 21. The magnet 25 faces the yoke 35 with a gap in the radial direction. A spacing L1 between the magnet 25 and the yoke 35 in the radial direction is smaller than a wall thickness difference L2 between the thin-walled part 261 and the thick-walled part 263. The wall thickness difference L2 can also be said to be a step difference between the thin-walled part 261 and the thick-walled part 263.

The magnet 25 contains magnet powder, which is a hard magnetic body, and resin. The magnet 25 is formed by solidifying a material in which magnet powder and resin are mixed with each other. The magnet 25 is called a bonded magnet. Specific examples of the hard magnetic body include ferrite and neodymium. Specific examples of the resin include polyphenylene sulfide (PPS) and polyamide 12 (PA12). In the present embodiment, the coefficient of linear expansion of the intermediate member 26 is smaller than the coefficient of linear expansion of the resin of the magnet. Note that the resin used for the magnet 25 may be the same as the resin used for the intermediate member 26.

As illustrated in FIG. 8, the magnet 25 includes a mounting part 251 and a tapered part 253. The mounting part 251 is a part being in contact with the intermediate member 26. The wall thickness of the mounting part 251 is constant. The tapered part 253 is placed at the rear of the mounting part 251. The tapered part 253 faces the rotating member connecting part 211 in the radial direction. The wall thickness of the tapered part 253 decreases toward one end in the axial direction (the rear). The wall thickness of the tapered part 253 decreases as the distance from the mounting part 251 increases. More specifically, the outer diameter of the tapered part 253 is constant, and only the inner diameter of the tapered part 253 increases as the distance from the mounting part 251 increases. The length of the tapered part 253 in the axial direction is ¼ or more and ½ or less of the length of the entire magnet 25 in the axial direction, for example. When viewed in the axial direction, the magnet 25 does not overlap the sleeve end 219. The outer diameter E219 of the sleeve end 219 is smaller than a minimum inner diameter 125 of the magnet 25.

The sleeve 31 is a nonmagnetic body and metal. Specific examples of the nonmagnetic metal include austenitic stainless steel (SUS 304). As illustrated in FIG. 5, the sleeve 31 is a tubular member and is mounted on the output shaft 82b. Specifically, the sleeve 31 is press-fit onto an outer circumferential face of the output shaft 82b. A front end face of the sleeve 31 is not in contact with the output shaft 82b. That is, a gap in the axial direction is provided between the front end face of the sleeve 31 and the output shaft 82b. The position of a rear end face of the sleeve 31 in the axial direction is equal to the position of a rear end face of the output shaft 82b in the axial direction. The rear end face of the sleeve 31 is aligned with the rear end face of the output shaft 82b to position the sleeve 31.

The carrier 32 is a nonmagnetic body. The carrier 32 is resin, for example. Specific examples of the resin include polybutylene terephthalate (PBT) and polyacetal resin (POM). The carrier 32 is a tubular member and is mounted on the output shaft 82b via the sleeve 31. As illustrated in FIG. 5, the carrier 32 includes a small diameter part 321, a large diameter part 322, and a projection 327. As illustrated in FIG. 5, the carrier 32 is formed integrally with the sleeve 31 by injection molding. The small diameter part 321 is a cylindrical member and is in contact with an outer circumferential face of the sleeve 31. The large diameter part 322 is a cylindrical member. The outer diameter of the large diameter part 322 is larger than the outer diameter of the small diameter part 321. The large diameter part 322 is positioned at the rear of the small diameter part 321. A front end of the large diameter part 322 is coupled to a rear end of the small diameter part 321. The projection 327 protrudes to the rear from a rear end face of the small diameter part 321 and faces the magnet 25. There is a gap between the projection 327 and the magnet 25.

As illustrated in FIG. 10, the yoke 35 includes a first yoke 351 and a second yoke 352. The first yoke 351 and the second yoke 352 are each a soft magnetic body. Specific examples of the soft magnetic body include nickel-iron alloys. The first yoke 351 and the second yoke 352 are fixed to the carrier 32. The first yoke 351 and the second yoke 352 rotate with the output shaft 82b, the sleeve 31, and the carrier 32. The first yoke 351 includes a first ring part 351a and a plurality of first teeth parts 351b. The first ring part 351a is a plate orthogonal to the axial direction. The first teeth parts 351b protrude toward the front from the first ring part 351a. The first teeth parts 351b are placed at regular intervals in the circumferential direction. The second yoke 352 includes a second ring part 352a and a plurality of second teeth parts 352b. The second ring part 352a is a plate parallel to the first ring part 351a and is positioned at the front of the first ring part 351a. The second teeth parts 352b protrude toward the rear from the second ring part 352a. The second teeth parts 352b are placed at regular intervals in the circumferential direction. One second teeth part 352b is positioned between two first teeth parts 351b. That is, the first teeth parts 351b and the second teeth parts 352b are placed alternately in the circumferential direction. The first teeth parts 351b and the second teeth parts 352b face the magnet 25.

The sensor housing 40 is a nonmagnetic body. The sensor housing 40 is resin, for example. Specific examples of the resin include polybutylene terephthalate (PBT) and polyamide 66. As illustrated in FIG. 5, a bushing 403 is placed in a hole 401 of the sensor housing 40. The bushing 403 is an aluminum alloy, for example, and is formed integrally with the sensor housing 40. The sensor housing 40 is fixed to the intermediate plate 10 with a bolt passing through the bushing 403.

As illustrated in FIG. 7, the magnetism collecting member 46 includes a first magnetism collecting member 461 and a second magnetism collecting member 462. The first magnetism collecting member 461 and the second magnetism collecting member 462 are each a soft magnetic body and are a nickel-iron alloy, for example. The first magnetism collecting member 461 and the second magnetism collecting member 462 are fixed to the sensor housing 40. As illustrated in FIG. 7, the first magnetism collecting member 461 faces the first ring part 351a. There is a gap between the first magnetism collecting member 461 and the first ring part 351a. In response to the magnetization of the first yoke 351, the first magnetism collecting member 461 is magnetized. The second magnetism collecting member 462 faces the second ring part 352a. There is a gap between the second magnetism collecting member 462 and the second ring part 352a. In response to the magnetization of the second yoke 352, the second magnetism collecting member 462 is magnetized.

Although the torque sensor 1 is basically designed based on a sufficient safety factor, owing to vibration, shock, or the like applied to the torque sensor 1, the magnet 25 may shift with respect to the input shaft 82a together with the sleeve 21 in the axial direction. Alternatively, the yoke 35 may shift with respect to the output shaft 82b together with the sleeve 31 and the carrier 32 in the axial direction. In the torque sensor 1 of the present embodiment, even if the sleeve 21 moves with respect to the input shaft 82a, the magnet 25 hits the carrier 32, making it easy for the shift of the magnet 25 to be an allowable value or less. In addition, even if the sleeve 31 and the carrier 32 move with respect to the output shaft 82b, the carrier 32 hits the magnet 25, making it easy for the shift of the yoke 35 to be an allowable value or less. Thus, the torque sensor 1 has robustness. Consequently, the torque sensor 1 can prevent deterioration in detection accuracy.

The printed circuit board 43 is fixed to the sensor housing 40. The Hall IC 47 is mounted on the printed circuit board 43. The Hall IC 47 is placed between the first magnetism collecting member 461 and the second magnetism collecting member 462. There is a gap between the Hall IC 47 and the first magnetism collecting member 461 and between the Hall IC 47 and the second magnetism collecting member 462. The Hall IC 47 changes a signal to be output in response to a change in the magnetic flux density between the first magnetism collecting member 461 and the second magnetism collecting member 462. The Hall IC 47 outputs the signal to the ECU 90.

When the steering wheel 81 is operated, torque is transmitted to the input shaft 82a. The output shaft 82b is coupled to the input shaft 82a via the torsion bar 82c, and thus the input shaft 82a rotates relatively with respect to the output shaft 82b. Thus, the magnet 25 rotates relatively with respect to the first teeth parts 351b and the second teeth parts 352b.

With this rotation, the strength of the magnetization of each of the first yoke 351 and the second yoke 352 changes. Thus, the magnetic flux density between the first magnetism collecting member 461 and the second magnetism collecting member 462 changes. The Hall IC 47 detects this change in the magnetic flux density. The ECU 90 controls the electric motor 93 using steering torque calculated based on the output signal of the Hall IC 47.

The first cover 48 is a nonmagnetic body. The first cover 48 is resin, for example. Specific examples of the resin include polybutylene terephthalate (PBT) and polyamide 66. As illustrated in FIG. 6, the first cover 48 is mounted on a rear end of the sensor housing 40. The first cover 48 covers the printed circuit board 43.

The second cover 49 is a nonmagnetic body. The second cover 49 is resin, for example. Specific examples of the resin include polybutylene terephthalate (PBT) and polyamide 66. As illustrated in FIG. 6, the second cover 49 is mounted on a front end of the sensor housing 40. As illustrated in FIG. 7, the second cover 49 includes an annular body 491 and a plurality of claws 492. The claws 492 are placed at regular intervals in the circumferential direction. The claws 492 protrude toward the front from the body 491. The claws 492 are inserted into the intermediate plate 10 through light press-fitting and are in contact with an inner circumferential face of the intermediate plate 10. With this structure, the center of the sensor housing 40 when viewed in the axial direction easily matches the center of the intermediate plate 10.

FIG. 12 to FIG. 18 are schematic diagrams of a method for manufacturing the magnet assembly of the present embodiment. The method for manufacturing the magnet assembly 20 of the present embodiment includes a sleeve processing step, a first mold placing step, an intermediate member forming step, a second mold placing step, and a magnet forming step.

Figure 12:
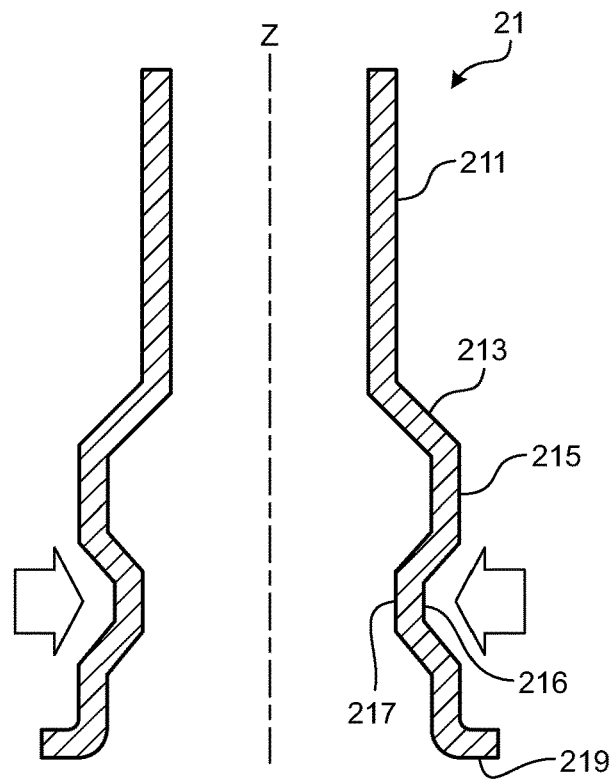
FIG. 12 is a schematic diagram of a method for manufacturing the magnet assembly of the present embodiment (a plastic deformation step for an outer circumferential face).

In the sleeve processing step, as illustrated in FIG. 12, the outer circumferential face of the intermediate member connecting part 215 is plastically deformed in the radial direction. The outer circumferential face of the intermediate member connecting part 215 is plastically deformed inward in the radial direction by press working, for example, to form the recesses 216 and the protrusions 217.

Figure 13:
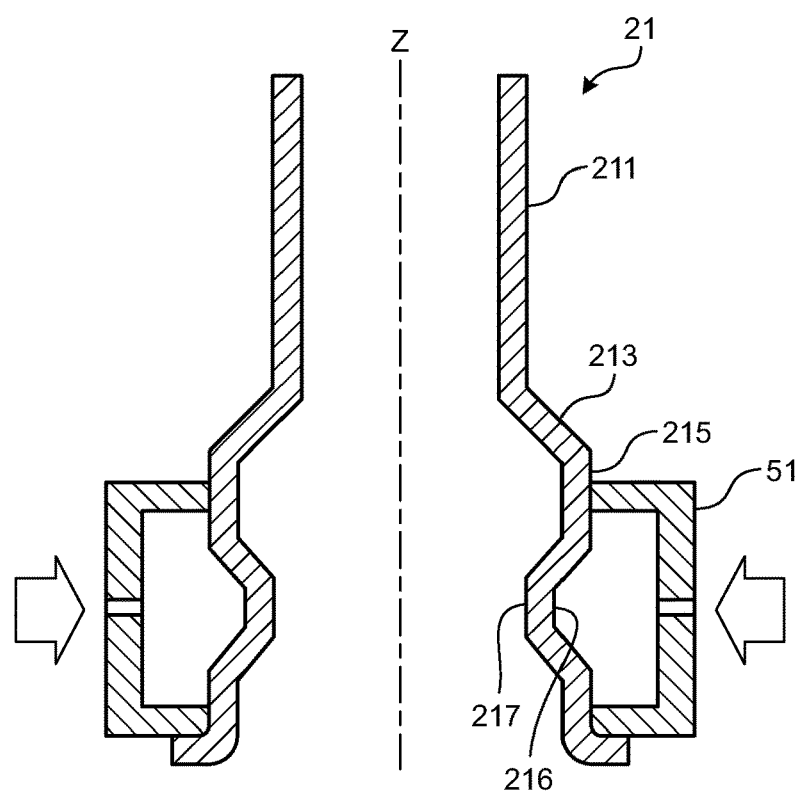
FIG. 13 is a schematic diagram of the method for manufacturing the magnet assembly of the present embodiment (a first mold placing step).

After the sleeve processing step, the first mold placing step is performed. At the first mold placing step, as illustrated in FIG. 13, a first mold 51 is placed outside the intermediate member connecting part 215. The first mold 51 is a hollow mold formed of metal. The first mold 51 includes an introduction channel for introducing resin and a discharge channel for discharging the resin. The first mold 51 can be divided into two parts along a plane containing the central axis Z. The divided first mold 51 is mounted on the intermediate member connecting part 215 from both sides as indicated by the arrows in FIG. 13.

Figure 14:
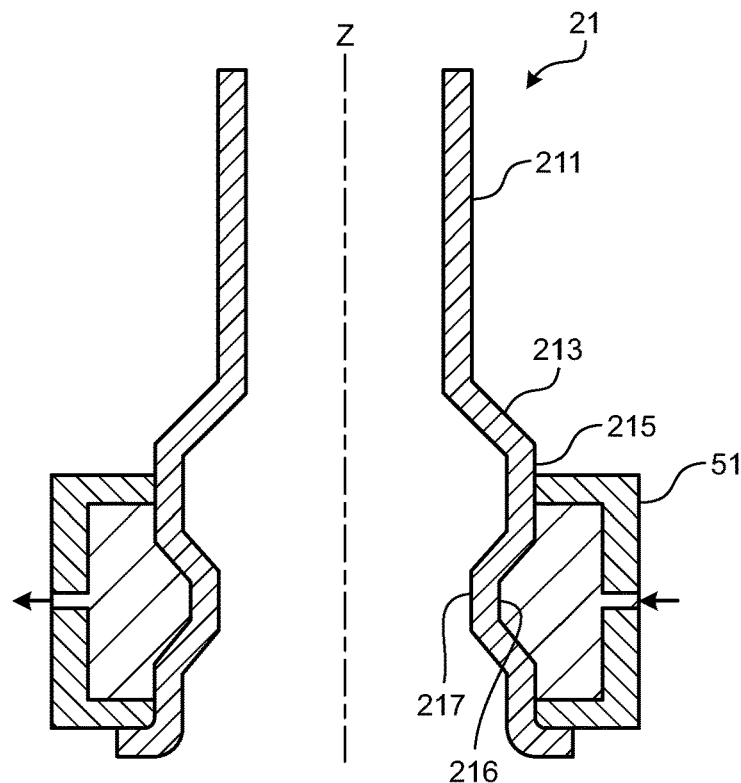
FIG. 14 is a schematic diagram of the method for manufacturing the magnet assembly of the present embodiment (an intermediate member filling step).
Figure 15:
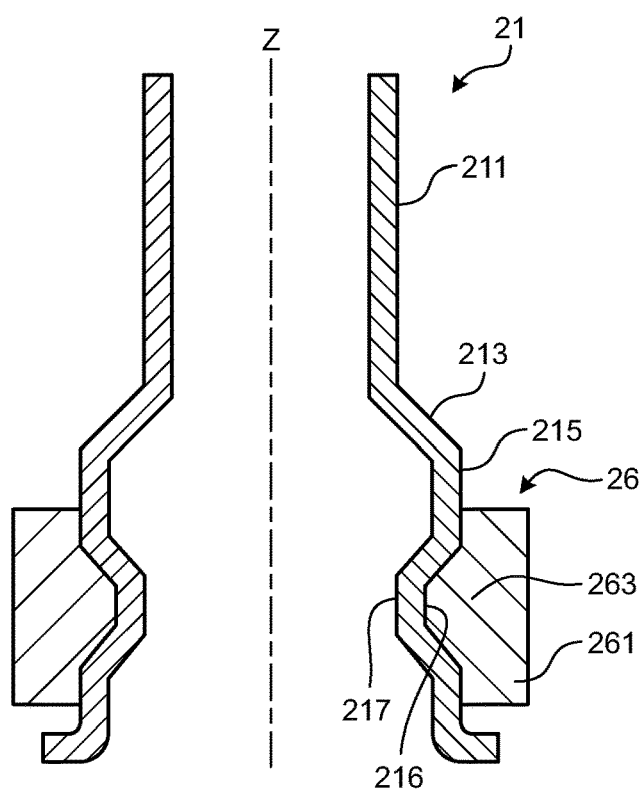
FIG. 15 is a schematic diagram of the method for manufacturing the magnet assembly of the present embodiment (a first mold removing step).

After the first mold placing step, the intermediate member forming step is performed. At the intermediate member forming step, as illustrated in FIG. 14, the first mold 51 is filled with resin. In the intermediate member forming step, injection molding is used. That is, a nozzle of a cylinder with melted resin in it is placed in the introduction channel of the first mold 51. The melted resin is extruded from the cylinder and enters the inside of the first mold 51. Excess melted resin is discharged from the discharge channel of the first mold 51. After the melted resin in the first mold 51 is cooled, as illustrated in FIG. 15, the first mold 51 is removed. With this operation, the intermediate member 26 including the thin-walled part 261 and the thick-walled parts 263 is formed.

Figure 16:
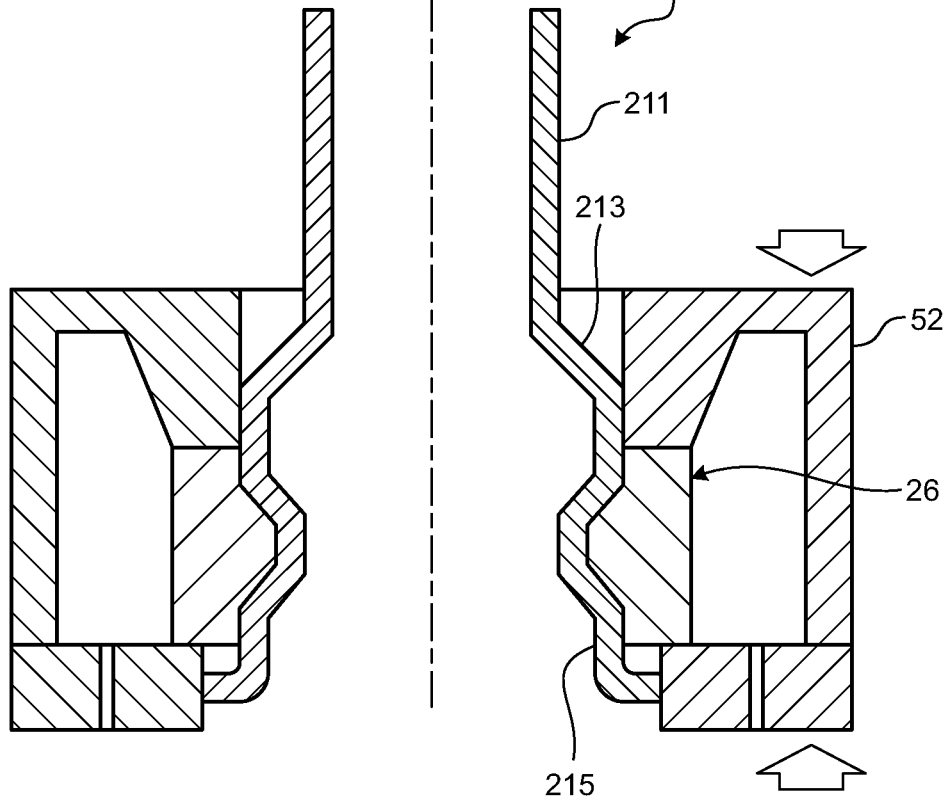
FIG. 16 is a schematic diagram of the method for manufacturing the magnet assembly of the present embodiment (a second mold placing step).

After the intermediate member forming step, the second mold placing step is performed. At the second mold placing step, as illustrated in FIG. 16, a second mold 52 is placed outside the intermediate member 26. The second mold 52 is a hollow mold formed of metal. The second mold 52 includes an introduction channel for introducing resin and a discharge channel for discharging the resin. The second mold 52 can be divided into two parts along a plane orthogonal to the central axis Z. The divided second mold 52 is mounted on the intermediate member 26 from both sides as indicated by the arrows in FIG. 16.

Figure 17:
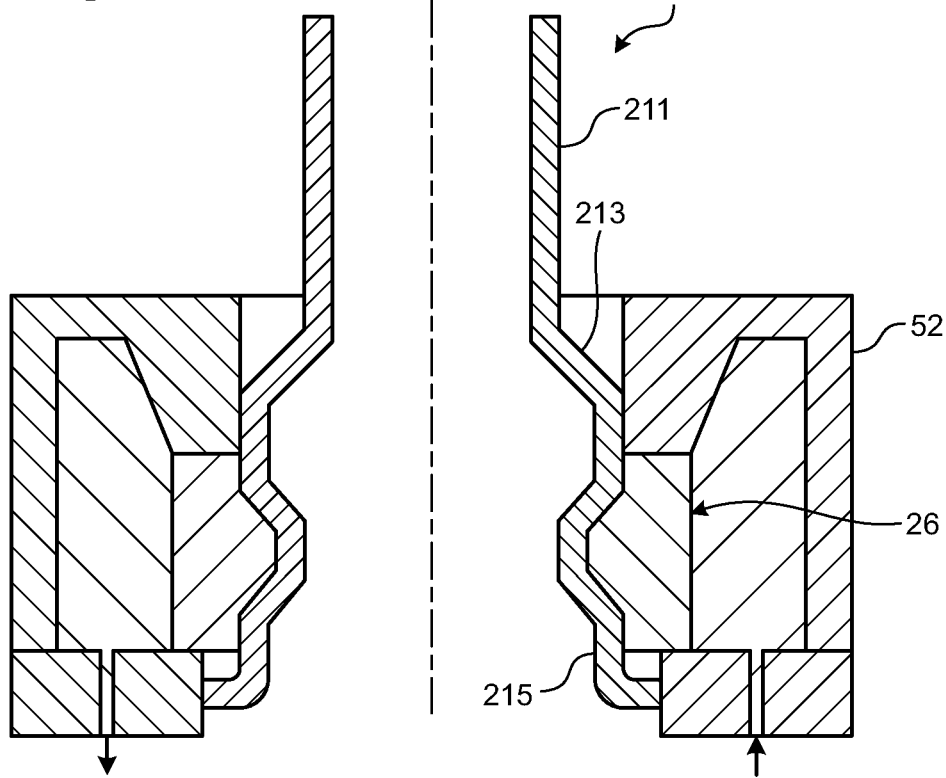
FIG. 17 is a schematic diagram of the method for manufacturing the magnet assembly of the present embodiment (a magnet filling step).
Figure 18:
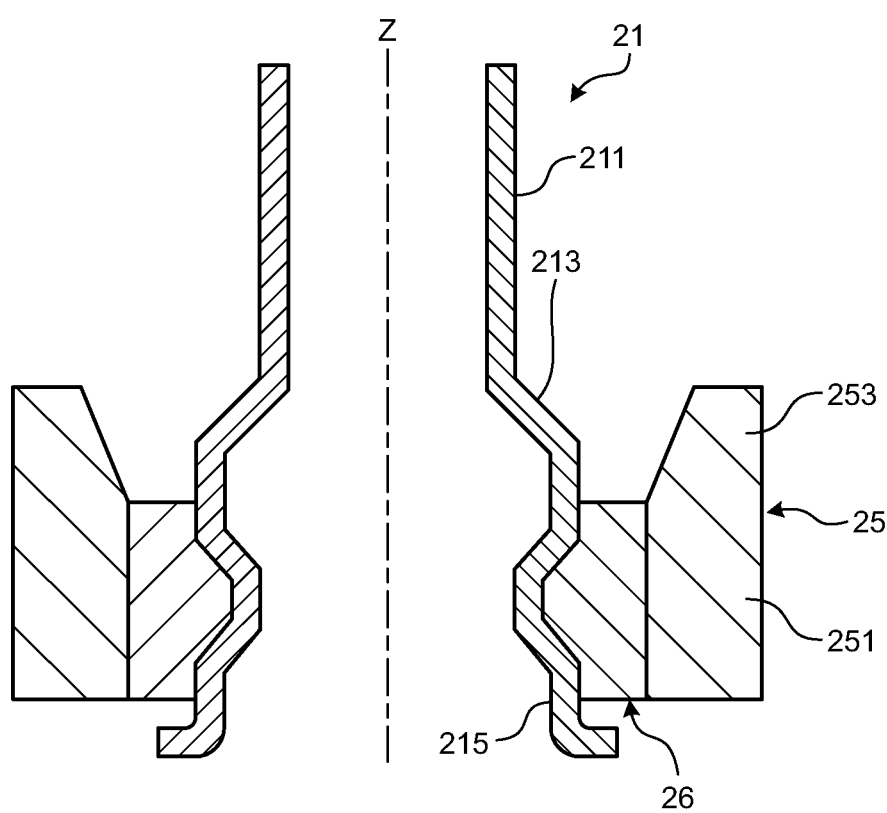
FIG. 18 is a schematic diagram of the method for manufacturing the magnet assembly of the present embodiment (a second mold removing step).

After the second mold placing step, the magnet forming step is performed. At the magnet forming step, as illustrated in FIG. 17, the second mold 52 is filled with resin. In the magnet forming step, injection molding is used. That is, a nozzle of a cylinder with melted resin in it is placed in the introduction channel of the second mold 52. The melted resin is extruded from the cylinder and enters the inside of the second mold 52. Excess melted resin is discharged from the discharge channel of the second mold 52. After the melted resin in the second mold 52 is cooled, as illustrated in FIG. 18, the second mold 52 is removed. With this operation, the magnet 25 including the mounting part 251 and the tapered part 253 is formed.

The sleeve 21 is not necessarily required to be mounted on the input shaft 82a. The sleeve 21 and the magnet 25 may be mounted on the output shaft 82b, whereas the sleeve 31 and the yoke 35 may be mounted on the input shaft 82a, for example. When mounted on the output shaft 82b, the sleeve 21 is press-fit onto the outer circumferential face of the output shaft 82b.

The intermediate member connecting part 215 of the sleeve 21 is not necessarily required to include the recesses 216 and the protrusions 217. The intermediate member connecting part 215 is only required to include parts in which the thick-walled parts 263 are caught. The intermediate member connecting part 215 may have through holes, and the thick-walled parts 263 may be disposed in the through holes, for example. The outer diameter of the intermediate member connecting part 215 is not necessarily required to be larger than the outer diameter of the rotating member connecting part 211. The outer diameter of the intermediate member connecting part 215 may be smaller than the outer diameter of the rotating member connecting part 211 or the same as the outer diameter of the rotating member connecting part 211.

As described above, the torque sensor 1 of the present embodiment includes the sleeve 21, the intermediate member 26, the magnet 25, and the yoke 35. The sleeve 21 is an annular member mounted on the first rotating member (the input shaft 82a). The intermediate member 26 is an annular member placed on the outer circumferential face of the sleeve 21. The magnet 25 is an annular member placed on the outer circumferential face of the intermediate member 26. The yoke 35 is mounted on the second rotating member (the output shaft 82b) rotating with respect to the first rotating member and faces the magnet 25 in the radial direction, which is a direction orthogonal to the central axis Z of the sleeve 21. The sleeve 21 includes the rotating member connecting part 211 and the intermediate member connecting part 215. The rotating member connecting part 211 is cylindrical and is in contact with the first rotating member. The intermediate member connecting part 215 is cylindrical and is at a position shifted with respect to the rotating member connecting part 211 in the axial direction parallel to the central axis Z. The intermediate member 26 includes the thin-walled part 261 and the thick-walled parts 263 having a wall thickness larger than the wall thickness of the thin-walled part 261. The inner circumferential face of the thin-walled part 261 and the inner circumferential face of the thick-walled parts 263 are in contact with the intermediate member connecting part 215.

The rotating member connecting part 211 is in contact with the first rotating member (the input shaft 82a) to prevent the deformation of the intermediate member connecting part 215 holding the magnet 25 when the sleeve 21 is press-fit onto the first rotating member. Thus, the distance between the magnet 25 and the yoke 35 (the first teeth parts 351b and the second teeth parts 352b) is less likely to deviate from a designed value. Consequently, the torque sensor 1 can prevent deterioration in detection accuracy. By the way, in Patent Literature 1 described above, there is a problem in that the magnet is mounted on the sleeve with an adhesive, and thus when producing the sensor, it is necessary to align the magnet with the sleeve and then mount it on the sleeve, which makes a step of production complicated. In contrast, in the torque sensor 1 of the present embodiment, the intermediate member 26 includes the thin-walled part 261 and the thick-walled parts 263. With this structure, the thick-walled parts 263 are caught in the outer circumferential face of the sleeve 21. Relative movement of the intermediate member 26 and the sleeve 21 in the axial direction and the circumferential direction is prevented. In addition, when producing the torque sensor 1 of the present embodiment in the manner described above, after forming the intermediate member 26 on the outer circumference of the sleeve 21, the magnet 25 is formed on the outer circumference of the intermediate member 26, thus eliminating the need to position the magnet 25 with respect to the sleeve 21, and thus the step of production can be simplified.

In the torque sensor 1 of the present embodiment, the outer diameter of the intermediate member connecting part 215 is larger than the outer diameter of the rotating member connecting part 211.

With this structure, the stress occurring in the rotating member connecting part 211 in the step of press-fitting the sleeve 21 onto the input shaft 82a is absorbed by the deformation of the enlarged part 213 lying between the rotating member connecting part 211 and the intermediate member connecting part 215. Thus, the stress having occurred in the step of press-fitting the sleeve 21 can be prevented from being transmitted to the intermediate member connecting part 215.

In the torque sensor 1 of the present embodiment, the outer diameter of the intermediate member connecting part 215 may be smaller than the outer diameter of the rotating member connecting part 211.

With this structure, the magnet 25 can be placed more inside in the radial direction compared to a case in which the outer diameter of the intermediate member connecting part 215 is larger than the outer diameter of the rotating member connecting part 211. Thus, the torque sensor 1 can be reduced in size.

The outer diameter of the intermediate member connecting part 215 may be the same as the outer diameter of the rotating member connecting part 211.

With this structure, the magnet 25 can be placed more inside in the radial direction compared to the case in which the outer diameter of the intermediate member connecting part 215 is larger than the outer diameter of the rotating member connecting part 211. Thus, the torque sensor 1 can be reduced in size. In addition, the shape of the sleeve 21 is simpler, and thus the step of manufacturing the sleeve 21 can be simplified.

In the torque sensor 1 of the present embodiment, the magnet 25 includes the tapered part 253 the wall thickness of which decreases toward one end in the axial direction. The tapered part 253 faces the rotating member connecting part 211 in the radial direction.

To reduce the stress acting on the magnet 25 when the rotating member connecting part 211 is press-fit onto the first rotating member (the input shaft 82a), a gap in the radial direction is provided between the magnet 25 and the small diameter part. To form the gap, it is necessary to allow the mold (the second mold 52) to enter the gap when forming the magnet 25. In the torque sensor 1 of the present embodiment, the magnet 25 includes the tapered part 253, thereby facilitating removal of the mold used when forming the magnet 25.

In the torque sensor 1 of the present embodiment, the intermediate member 26 includes the even number of thick-walled parts 263. The even number of thick-walled parts 263 are placed at regular intervals in the circumferential direction.

The recesses of the sleeve 21 corresponding to the thick-walled parts 263 are formed by press working, for example. An even number of recesses will be placed at regular intervals in the circumferential direction, thus facilitating press working on the sleeve 21. Forming the recesses by press working is suitable when the sleeve 21 has a thin-walled cylindrical shape. Making the sleeve shape thinner can reduce the weight of the torque sensor 1.

In the torque sensor 1 of the present embodiment, in the cross section containing the central axis Z, the thick-walled part 263 lies between a part of the thin-walled part 261 and another part of the thin-walled part 261 in the axial direction.

If the thick-walled parts 263 are placed at an end of the intermediate member 26 in the axial direction, to stop the movement of the intermediate member 26 with respect to the sleeve 21 by the thick-walled parts 263 by the thick-walled parts 263, the thick-walled parts 263 are required to be provided at both ends of the intermediate member 26. That is, the thick-walled parts 263 are required to be placed in two rows. In contrast, in the torque sensor 1 of the present embodiment, at least one thick-walled part 263 is enough to stop the movement of the intermediate member 26 with respect to the sleeve 21. The torque sensor 1 of the present embodiment can reduce the number of the required thick-walled parts 263.

In the torque sensor 1 of the present embodiment, the intermediate member connecting part 215 includes the recesses 216 provided on the outer circumferential face and the protrusions 217 provided on the back side of the recesses 216.

With this structure, the recesses 216 and the protrusions 217 can be easily formed by press working. The torque sensor 1 of the present embodiment can facilitate the step of forming the parts in which the thick-walled parts 263 are caught in the sleeve 21.

In the torque sensor 1 of the present embodiment, the protrusions 217 are placed outside the inner circumferential face of the rotating member connecting part 211 in the radial direction.

With this structure, when the sleeve 21 is press-fit onto the first rotating member (the input shaft 82a), the protrusions 217 are prevented from hitting the first rotating member. Thus, no force directly acts on the intermediate member connecting part 215 from the first rotating member. The torque sensor 1 of the present embodiment can reduce the stress occurring in the intermediate member 26 and the magnet 25.

In the torque sensor 1 of the present embodiment, the spacing L1 between the magnet 25 and the yoke 35 in the radial direction is smaller than the wall thickness difference L2 between the thin-walled part 261 and the thick-wall part 263.

With this structure, even if an abnormality occurs in the magnet 25, and the magnet 25 moves in a direction approaching the yoke 35, the thick-walled parts 263 remains caught in the sleeve 21. Thus, the magnet 25 does not fall out of the sleeve 21. The torque sensor 1 of the present embodiment can reduce the possibility of becoming a state with no signal output.

In the torque sensor 1 of the present embodiment, the intermediate member 26 is resin. The magnet 25 contains magnet powder and resin. The coefficient of linear expansion of the intermediate member 26 is smaller than the coefficient of linear expansion of the resin of the magnet 25.

With this structure, the torque sensor 1 of the present embodiment can reduce the stress occurring in the intermediate member 26 and the magnet 25 even when the intermediate member 26 and the magnet 25 are exposed to an environment with temperature changes.

In the torque sensor 1 of the present embodiment, the intermediate member 26 is resin. The magnet 25 contains magnet powder and resin. The resin of the intermediate member 26 and the resin of the magnet 25 are the same material.

With this structure, the torque sensor 1 of the present embodiment can reduce the stress occurring in the intermediate member 26 and the magnet 25 even when the intermediate member 26 and the magnet 25 are exposed to an environment with temperature changes.

The method for manufacturing the magnet assembly 20 of the present embodiment includes the first mold placing step, the intermediate member forming step, the second mold placing step, and the magnet forming step. The first mold placing step is a step of placing the first mold 51 outside the intermediate member connecting part 215. The intermediate member forming step is a step of filling the first mold 51 with resin to form the intermediate member 26 including the thin-walled part 261 and the thick-walled parts 263 having a wall thickness larger than the wall thickness of the thin-walled part 261. The second mold placing step is a step of placing the second mold 52 outside the intermediate member 26. The magnet forming step is a step of filling the second mold 52 with resin containing magnet powder to form the magnet 25.

With these steps, the intermediate member 26 and the magnet 25, both of which contain resin, tightly adhere to each other. Thus, relative movement of the intermediate member 26 and the magnet 25 in the axial direction and the circumferential direction is prevented. The intermediate member 26 includes the thin-walled part 261 and the thick-walled parts 263. With this structure, the thick-walled parts 263 are caught in the outer circumferential face of the sleeve 21. Relative movement of the intermediate member 26 and the sleeve 21 in the axial direction and the circumferential direction is prevented. Thus, the possibility of the occurrence of positional deviation of the magnet 25 reduces. Consequently, the method for manufacturing the magnet assembly 20 of the present embodiment can further prevent deterioration in detection accuracy.

The method for manufacturing the magnet assembly 20 of the present embodiment includes, prior to the first mold placing step, the sleeve processing step, in which the outer circumferential face of the intermediate member connecting part 215 is plastically deformed in the radial direction, which is a direction orthogonal to the central axis Z.

With this step, the method for manufacturing the magnet assembly 20 of the present embodiment can easily form the parts in which the thick-walled parts 263 are caught in the sleeve 21 by press working, for example.

In the method for manufacturing the magnet assembly 20 of the present embodiment, injection molding is used in the intermediate member forming step and the magnet forming step.

With this method, the method for manufacturing the magnet assembly 20 of the present embodiment can form the intermediate member 26 and the magnet 25 more easily.

The torque sensor 1 of the present embodiment includes the sleeve 21, the intermediate member 26, the magnet 25, and the yoke 35. The sleeve 21 is an annular member mounted on the first rotating member (the input shaft 82*a*). The intermediate member 26 is an annular member placed on the outer circumferential face of the sleeve 21. The magnet 25 is an annular member placed on the outer circumferential face of the intermediate member 26. The yoke 35 is mounted on the second rotating member (the output shaft 82*b*) rotating with respect to the first rotating member and faces the magnet 25 in the radial direction, which is a direction orthogonal to the central axis Z of the sleeve 21. The sleeve 21 includes the rotating member connecting part 211 and the intermediate member connecting part 215. The rotating member connecting part 211 is cylindrical and is in contact with the first rotating member. The intermediate member connecting part 215 is cylindrical and is at a position shifted with respect to the rotating member connecting part 211 in the axial direction parallel to the central axis Z. The outer diameter E219 of the sleeve end 219, which is the end of the intermediate member connecting part 215 opposite from the rotating member connecting part 211, is smaller than the minimum inner diameter 125 of the magnet 25.

The rotating member connecting part 211 is in contact with the first rotating member (the input shaft 82*a*) to prevent the deformation of the intermediate member connecting part 215 holding the magnet 25 when the sleeve 21 is press-fit onto the first rotating member. Thus, the distance between the magnet 25 and the yoke 35 (the first teeth parts 351*b* and the second teeth parts 352*b*) is less likely to deviate from the designed value. Consequently, the torque sensor 1 can prevent deterioration in detection accuracy. By the way, the sleeve supporting the magnet in Patent Literature 1 is desirably small in the radial direction while including the small diameter part and the large diameter part. However, if the step between the small diameter part and the large diameter part is made smaller, when the sleeve is press-fit onto the steering shaft, the step between the small diameter part and the large diameter part cannot be pushed. Although the tip of the large diameter part can be pushed in place of the step, pushing the tip of the large diameter part may cause stress in the magnet. When stress occurs in the magnet, the magnetic properties of the magnet change, which may thus produce magnets that do not meet shipping specifications. Thus, in the manufacture of steering apparatuses, the yield reduces. In contrast, in the torque sensor 1 of the present embodiment, the outer diameter E219 of the sleeve end 219 is smaller than the minimum inner diameter 125 of the magnet 25. Thus, even if the sleeve end 219 is pushed when the sleeve 21 is press-fit onto the first rotating member, stress is less likely to occur in the magnet 25. Consequently, the torque sensor 1 of the present embodiment can prevent deterioration in detection accuracy and prevent stress from occurring in the magnet 25 when it is fixed to the rotating member.

In the torque sensor 1 of the present embodiment, the outer diameter E219 of the sleeve end 219 is larger than the inner diameter I269 of the intermediate member end 269, which is the end of the intermediate member 26 opposite from the rotating member connecting part 211, and is smaller than the outer diameter E269 of the intermediate member end 269.

With this structure, the sleeve end 219 prevents the intermediate member 26 from falling, and thus the possibility of the occurrence of positional deviation of the intermediate member 26 reduces. Consequently, the torque sensor 1 of the present embodiment can further reduce the possibility of the occurrence of deterioration in detection accuracy.

In the torque sensor 1 of the present embodiment, the intermediate member 26 is placed with the gap C with respect to the sleeve end 219 in the axial direction.

With this structure, even if the sleeve end 219 is pushed when the sleeve 21 is press-fit onto the first rotating member, deformation is less likely to occur in the intermediate member 26. Consequently, stress is much less likely to occur in the magnet 25 being in contact with the intermediate member 26. Consequently, the torque sensor 1 of the present embodiment can further prevent the stress occurring in the magnet 25 when it is fixed to the rotating member.

First Modification

Figure 19:
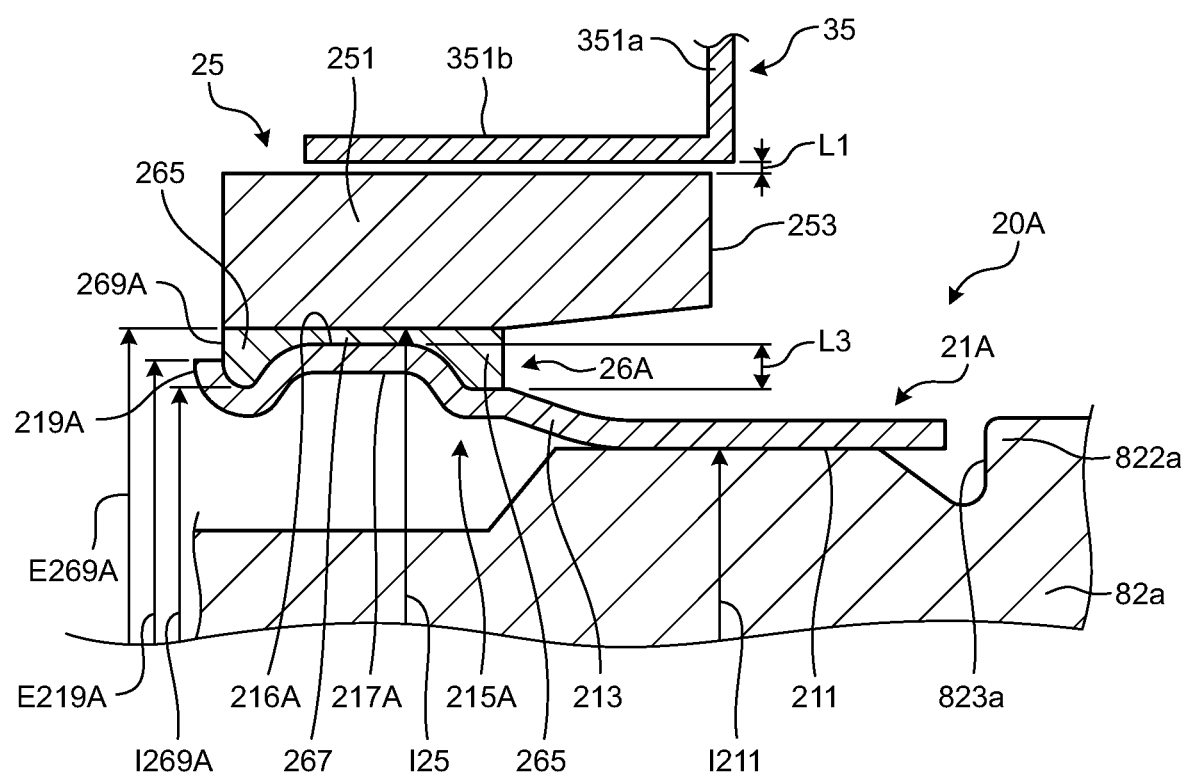
FIG. 19 is a sectional view of the area around a magnet assembly of a first modification.

FIG. 19 is a sectional view of the area around a magnet assembly of a first modification. Note that the same components as those described in the embodiment described above are denoted by the same symbols, and redundant descriptions are omitted.

As illustrated in FIG. 19, this magnet assembly 20A of the first modification includes a sleeve 21A and an intermediate member 26A. The sleeve 21A includes an intermediate member connecting part 215A. The intermediate member connecting part 215A includes a plurality of protrusions 216A, a plurality of recesses 217A, and a sleeve end 219A. The protrusions 216A are provided on an outer circumferential face of the intermediate member connecting part 215A. The recesses 217A are provided on an inner circumferential face of the intermediate member connecting part 215A. The recesses 217A are provided on the back side of the protrusions 216A. The protrusions 216A and the recesses 217A are formed in one step by press working, for example. That is, the outer circumferential face of the intermediate member connecting part 215A is plastically deformed outward in the radial direction to form the protrusions 216A and the recesses 217A. The protrusions 216A and the recesses 217A are placed at regular intervals in the circumferential direction. The sleeve end 219A is an end of the intermediate member connecting part 215A opposite from the rotating member connecting part 211 (the front side). The sleeve end 219A extends outward in the radial direction.

The intermediate member 26A includes a thick-walled part 265, a plurality of thin-walled parts 267, and an intermediate member end 269A. The wall thickness of the thin-walled parts 267 is smaller than the wall thickness of the thick-walled part 265. The thick-walled part 265 is formed in an annular shape, and an even number of thin-walled parts 267 are placed at regular intervals in the circumferential direction. In a cross section containing the central axis Z, a thin-walled part 267 lies between a part of the thick-walled part 265 and another part of the thick-walled part 265 in the axial direction. The thin-walled part 267 lies between the thick-walled part 265 at both sides in the axial direction. In other words, in the cross section containing the central axis Z, the wall thickness of the intermediate member 26A is not constant and varies with the position in the axial direction. Inner circumferential faces of the thick-walled part 265 and the thin-walled parts 267 are in contact with the outer circumferential face of the intermediate member connecting part 215A. The spacing L1 between the magnet 25 and the yoke 35 in the radial direction is smaller than a wall thickness difference L3 between the thin-walled part 261 and the thick-walled part 263.

The intermediate member end 269A is an end of the intermediate member 26A opposite from the rotating member connecting part 211 (the front side). When viewed in the axial direction, part of the intermediate member end 269A overlaps the sleeve end 219A. An outer diameter E219A of the sleeve end 219A is larger than an inner diameter I269A of the intermediate member end 269A and is smaller than an outer diameter E269A of the intermediate member end 269A. As in the relation between the intermediate member end 269 and the sleeve end 219 illustrated in FIG. 9, the intermediate member end 269A is placed with a gap with respect to the sleeve end 219A in the axial direction.

As described above, in the first modification, the intermediate member 26 includes the even number of thin-walled parts 267. When viewed in the axial direction, the even number of thin-walled parts 267 are placed at regular intervals in the circumferential direction, which is a direction along the circumference centered on the central axis Z.

The protrusions of the sleeve 21A corresponding to the thin-walled parts 267 are formed by press working, for example. An even number of protrusions will be placed at regular intervals in the circumferential direction, thus facilitating press working on the sleeve 21. Forming the protrusions by press working is suitable when the sleeve 21A has a thin-walled cylindrical shape. Making the sleeve shape thinner can reduce the weight of the torque sensor 1.

Second Modification

Figure 20:
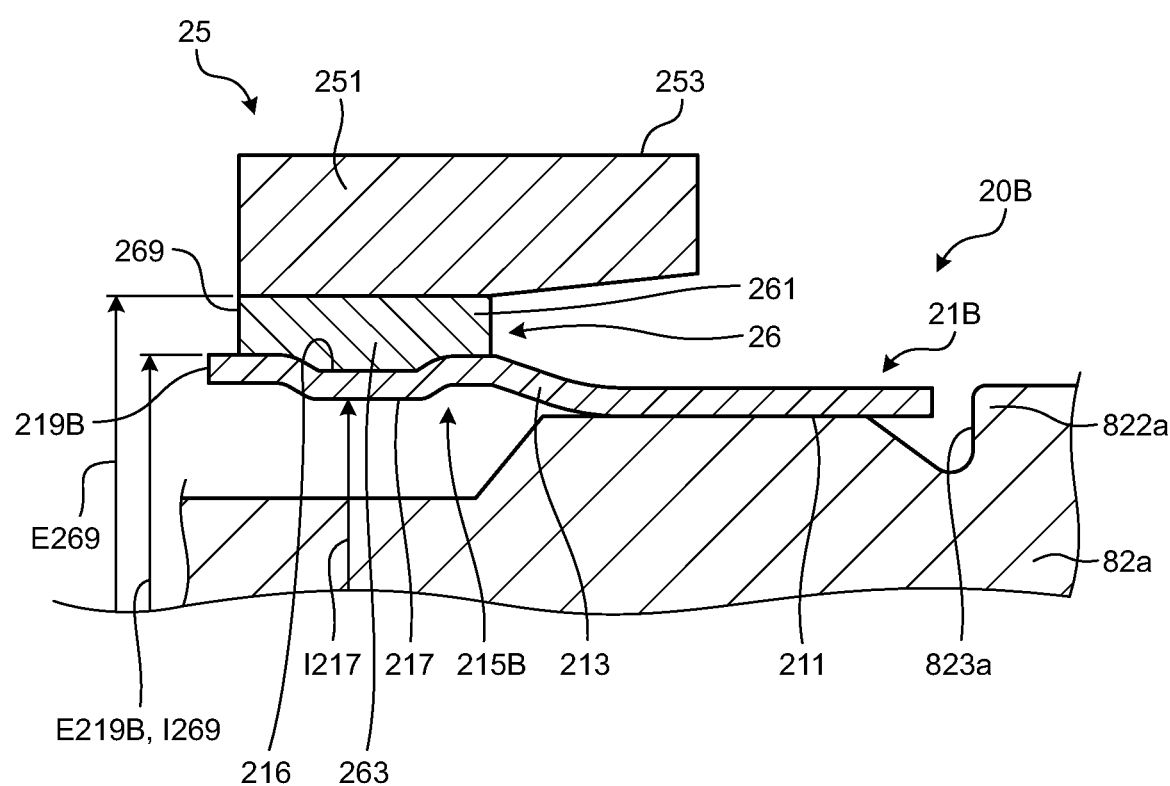
FIG. 20 is a sectional view of the area around a magnet assembly of a second modification.

FIG. 20 is a sectional view of the area around a magnet assembly of a second modification. Note that the same components as those described in the embodiment described above are denoted by the same symbols, and redundant descriptions are omitted.

As illustrated in FIG. 20, this magnet assembly 20B of the second modification includes a sleeve 21B. The sleeve 21B includes an intermediate member connecting part 215B. The intermediate member connecting part 215B includes a sleeve end 219B. The sleeve end 219B is an end of the intermediate member connecting part 215B opposite from the rotating member connecting part 211 (the front side). The sleeve end 219B extends outward in the radial direction.

When viewed in the axial direction, the intermediate member end 269 does not overlap the sleeve end 219B. An outer diameter E219B of the sleeve end 219B is not more than the inner diameter I269 of the intermediate member end 269. In the second modification, the outer diameter E219B of the sleeve end 219B is equal to the inner diameter I269 of the intermediate member end 269, for example. The sleeve end 219B protrudes with respect to the plane passing through end faces of the intermediate member 26 and the magnet 25 in the axial direction (toward the front).

As described above, in the second modification, the outer diameter E219B of the sleeve end 219B is not more than the inner diameter I269 of the intermediate member end 269, which is the end of the intermediate member 26 opposite from the rotating member connecting part 211.

With this structure, even if the sleeve end 219B is pushed when the sleeve 21B is press-fit onto the first rotating member, deformation is less likely to occur in the intermediate member 26. Consequently, stress is much less likely to occur in the magnet 25 being in contact with the intermediate member 26. Consequently, the magnet assembly 20B of the second modification can further prevent the stress occurring in the magnet 25 when it is fixed to the rotating member.

REFERENCE SIGNS LIST

1 TORQUE SENSOR
10 INTERMEDIATE PLATE
20, 20A, 20B MAGNET ASSEMBLY
21, 21A, 21B SLEEVE
25 MAGNET
26, 26A INTERMEDIATE MEMBER
31 SLEEVE
32 CARRIER
35 YOKE
40 SENSOR HOUSING
43 PRINTED CIRCUIT BOARD
46 MAGNETISM COLLECTING MEMBER
47 HALL IC
71, 72 BEARING
80 STEERING APPARATUS
81 STEERING WHEEL
82 STEERING SHAFT
82a INPUT SHAFT
82b OUTPUT SHAFT
82c TORSION BAR
83 STEERING FORCE ASSIST MECHANISM
84 UNIVERSAL JOINT
85 INTERMEDIATE SHAFT
86 UNIVERSAL JOINT
87 PINION SHAFT
88 STEERING GEAR
88a PINION
88b RACK
89 TIE ROD
90 ECU
92 SPEED REDUCER
93 ELECTRIC MOTOR
95 VEHICLE SPEED SENSOR
98 IGNITION SWITCH
99 POWER SUPPLY UNIT
211 ROTATING MEMBER CONNECTING PART
213 ENLARGED PART
215, 215A, 215B INTERMEDIATE MEMBER CONNECTING PART
216 RECESS
216A PROTRUSION
217 PROTRUSION
217A RECESS
219, 219A, 219B SLEEVE END
251 MOUNTING PART
253 TAPERED PART
261 THIN-WALLED PART
263 THICK-WALLED PART
265 THICK-WALLED PART
267 THIN-WALLED PART
269, 269A INTERMEDIATE MEMBER END
321 SMALL DIAMETER PART
322 LARGE DIAMETER PART
327 PROJECTION
920 GEARBOX
921 WORM WHEEL
922 WORM
C GAP
L1 SPACING
L2, L3 WALL THICKNESS DIFFERENCE
Z CENTRAL AXIS

The invention claimed is:

1. A torque sensor comprising:
an annular sleeve mounted on a first rotating member;
an intermediate member having an annular shape and placed on an outer circumferential face of the sleeve;
an annular magnet placed on an outer circumferential face of the intermediate member; and
a yoke mounted on a second rotating member rotating with respect to the first rotating member, the yoke facing the magnet in a radial direction that is a direction orthogonal to a central axis of the sleeve,
the sleeve including:
a cylindrical rotating member connecting part being in contact with the first rotating member; and
an intermediate member connecting part having a cylindrical shape at a position shifted with respect to the rotating member connecting part in an axial direction parallel to the central axis, and
an outer diameter of a sleeve end that is an end of the intermediate member connecting part opposite from the rotating member connecting part being smaller than a minimum inner diameter of the magnet, wherein
an end surface of an end of the sleeve in the axial direction, the end surface being disposed at a side opposite to a side of the cylindrical rotating member connecting part, is disposed further in the opposite side than an end surface of an end of the intermediate member and the magnet in the axial direction, the end surface being disposed at the side opposite to the side of the cylindrical rotating member connecting part.

2. The torque sensor according to claim 1, wherein an outer diameter of the intermediate member connecting part is larger than an outer diameter of the rotating member connecting part.

3. The torque sensor according to claim 1, wherein an outer diameter of the intermediate member connecting part is smaller than an outer diameter of the rotating member connecting part.

4. The torque sensor according to claim 1, wherein an outer diameter of the intermediate member connecting part and an outer diameter of the rotating member connecting part are same as each other.

5. The torque sensor according to claim 1, wherein the outer diameter of the sleeve end is larger than an inner diameter of an intermediate member end that is an end of the intermediate member opposite from the rotating member connecting part, and is smaller than an outer diameter of the intermediate member end.

6. The torque sensor according to claim 1, wherein the intermediate member is placed with a gap with respect to the sleeve end in the axial direction.

7. The torque sensor according to claim 1, wherein the outer diameter of the sleeve end is not more than an inner diameter of an intermediate member end that is an end of the intermediate member opposite from the rotating member connecting part.

8. The torque sensor according to claim 1, wherein
the intermediate member is disposed at the outer circumferential face of the intermediate member connecting part of the sleeve,
the intermediate member includes a thin-walled part and a thick-walled part that has a thicker wall thickness than a wall thickness of the thin-walled part in the radial direction, the thick-walled part being disposed shifted in the axial direction relative to the thin-walled part,
the outer circumferential face of the intermediate member is a cylindrical surface along an peripheral direction around the central axis of the sleeve,
an inner circumferential phase of the thin-walled part is disposed further outward in the radial direction than an inner circumferential phase of the thick-walled part,
the intermediate member connecting part includes a depression to insert the thick-walled part, and
a space between the magnet and the yoke in the radial direction is less than a difference between the wall thickness of the thin-wall part and the wall thickness of the thick-wall part.

9. The torque sensor according to claim 1, wherein
the magnet includes a mounting portion and a taper portion that is disposed shifted relative to mounting portion in the axial direction,
the taper portion has:
an outer circumferential face that is a cylindrical surface extending along the circumferential direction around the axial direction of the sleeve; and
an inner circumferential face that is a taper surface being further outward in the radial direction as being further apart from the fixing portion.

* * * * *